US010341785B2

(12) United States Patent

Barker et al.

(10) Patent No.: US 10,341,785 B2
(45) Date of Patent: Jul. 2, 2019

(54) HEARING DEVICE COMPRISING A LOW-LATENCY SOUND SOURCE SEPARATION UNIT

(71) Applicant: Oticon A/S, Smørum (DK)

(72) Inventors: Thomas Barker, Tampere (FI); Tuomas Virtanen, Tampere (FI); Niels Henrik Pontoppidan, Smørum (DK)

(73) Assignee: OTICON A/S, Smørum (DK)

( * ) Notice: Subject to any disclaimer, the term of this patent is extended or adjusted under 35 U.S.C. 154(b) by 135 days.

(21) Appl. No.: 14/874,641

(22) Filed: Oct. 5, 2015

(65) Prior Publication Data

US 2016/0099008 A1 Apr. 7, 2016

(30) Foreign Application Priority Data

Oct. 6, 2014 (EP) .................................... 14187767

(51) Int. Cl.
*G06F 17/00* (2006.01)
*H04R 25/00* (2006.01)
(Continued)

(52) U.S. Cl.
CPC .......... *H04R 25/505* (2013.01); *G10L 21/028* (2013.01); *H04R 2225/43* (2013.01); *H04S 1/005* (2013.01)

(58) Field of Classification Search
CPC .. H04R 2225/43; H04R 25/505; H04R 25/43; G10L 21/028; H04S 1/005; H04S 2420/01
See application file for complete search history.

(56) References Cited

U.S. PATENT DOCUMENTS 8,818,001 B2 8/2014 Hiroe
2004/0186717 A1* 9/2004 Savic ...................... G10L 21/02 704/256
(Continued)

FOREIGN PATENT DOCUMENTS

| | | | |
|---|---|---|---|
| EP | 1895515 | A1 | 3/2008 |
| EP | 2747458 | A1 | 6/2014 |
| WO | 2011/100802 | A1 | 8/2011 |

OTHER PUBLICATIONS

Joder et al. "Real-Time Speech Separation by Semi-supervised Nonnegative Matrix Factorization", 2012, vol. 7191, pp. 322-329.
(Continued)

*Primary Examiner* — Thomas H Maung
(74) *Attorney, Agent, or Firm* — Birch, Stewart, Kolasch & Birch, LLP

(57) ABSTRACT

The application relates to a hearing device comprising a) an input unit for delivering a time varying electric input signal representing an audio signal comprising at least two sound sources, b) a cyclic analysis buffer unit of length A adapted for storing the last A audio samples, c) a cyclic synthesis buffer unit of length, where L is smaller than A, adapted for storing the last L audio samples, which are intended to be separated in individual sound sources, d) a database having stored recorded sound examples from said at least two sound sources, each entry in the database being termed an atom, the atoms originating from audio samples from first and second buffers corresponding in size to said synthesis and analysis buffer units, where for each atom, the audio samples from the first buffer overlaps with the audio samples from the second buffer, and where atoms originating from the first buffer constitute a reconstruction dictionary, and where atoms originating from the second buffer constitute an analysis dictionary. The application further relates to a method of separating audio sources, and e) a sound source
(Continued)

separation unit for separating said electric input signal to provide separated signals representing said at least two sound sources, the sound source separation unit being configured to determine the most optimal representation (W) of the last A samples given the atoms in the analysis dictionary of the database, and to generate said at least two sound sources by combining atoms in the reconstruction dictionary of the database using the optimal representation (W). The invention may e.g. be used for hearing devices, e.g. hearing aids, headsets, ear phones, active ear protection systems, handsfree telephone systems, mobile telephones, teleconferencing systems, public address systems, classroom amplification systems, etc.

32 Claims, 10 Drawing Sheets

(51) Int. Cl.
*H04S 1/00* (2006.01)
*G10L 21/028* (2013.01)

(56) References Cited

U.S. PATENT DOCUMENTS

2011/0087349 A1* 4/2011 Ellis ........................ G10L 25/54
700/94
2013/0121506 A1* 5/2013 Mysore ................. G10L 21/028
381/94.2
2013/0132077 A1* 5/2013 Mysore ................. G10L 21/028
704/233

OTHER PUBLICATIONS

Plumbley et al. "Non-negative mixtures", In: "Handbook of Blind Source Separation", Jan. 1, 2010, pp. 515-547.
Smaragdis et al. "Convolutive Speech Bases and Their Application to Supervised Speech Separation", IEEE Transactions on Audio, Speech, and Language Processing, vol. 15, No. 1, Jan. 1, 2007.
Barker et al., "Real-time Auralisation System for Virtual Microphone Positioning," Proc. of the 15th Int. Conference on Digital Audio Effects (DAFx-12), Sep. 17-21, 2012, pp. 1-7.
Duan et al., "Online PLCA for Real-Time Semi-supervised Source Separation," LVA/ICA, LNCS, vol. 7191, 2012, 8 pgs.
Gomez, "Low Latency Audio Source Separation for Speech Enhancement in Cochlear Implants (Master's Thesis)," Universitat Pompeu Fabra, Barcelona, 2012, 67 pgs.
Marxer et al., "Low-Latency Instrument Separation in Polyphonic Audio Using Timbre Models," LVA/ICA, LNCS, vol. 7191, 2012, pp. 314-321.
Virtanen et al., "Active-Set Newton Algorithm for Non-Negative Sparse Coding of Audio," IEEE International Conference on Acoustic, Speech and Signal Processing (ICASSP), 2014, pp. 3092-3096.
Virtanen et al., "Active-Set Newton Algorithm for Overcomplete Non-Negative Representations of Audio," IEEE Transactions on Audio, Speech, and Language Processing, vol. 21, No. 11, Nov. 2013, pp. 2277-2289.

* cited by examiner

HEARING DEVICE COMPRISING A LOW-LATENCY SOUND SOURCE SEPARATION UNIT

TECHNICAL FIELD

The present application relates to hearing devices, in particular to sound source separation in a multi-source environment. The disclosure relates specifically to a hearing device comprising an input unit for providing one or more electric input signals representing sound from a sound environment generated by a number of sound sources.

The application furthermore relates to a method of separating sound sources in a multi-sound-source environment.

The application further relates to a data processing system comprising a processor and program code means for causing the processor to perform at least some of the steps of the method.

Embodiments of the disclosure may e.g. be useful in applications such as hearing devices, e.g. hearing aids, headsets, ear phones, active ear protection systems, hands-free telephone systems, mobile telephones, teleconferencing systems, public address systems, karaoke systems, classroom amplification systems, etc.

BACKGROUND

Audio sound source separation comprises the task of separation of different constituent sources within an audio mixture (the audio mixture comprising sound from a number of sources mixed in a sound field). Currently, most approaches to this problem have been performed 'offline', meaning that the entire audio mixture is present at the time of separation (generally in the form of a digital recording), rather than in 'realtime', where sources are separated as new audio data are entered into the system. In the cocktail party situation, the presence of multiple competing talkers can make listening to the information transmitted by a single source difficult, but successful sound source separation is able to present the listener with the information present from only a single talker at a time.

In order for sound source separation to be useful in real communication situations, it should be performed in real-time, or at very low latency. If a significant processing delay occurs between audio being spoken, and audio being separated, the listener may be perturbed by the asynchrony between talker mouth movement and corresponding audio, as well as receiving less benefit from possible lip-reading. Therefore, a sound source separation approach which operates at low latency (e.g. less than 20 ms between an audio sample entering and leaving the system) is advantageous. Current (additive mixture model based) sound-source separation approaches rely on the use of fairly long analysis frames (typically of the order of >50 ms), which, if implemented directly, would violate requirements for low latency.

In this context, we consider only what we refer to as 'data latency', in that it is assumed that the actual processing algorithms can be executed in time, given the correct implementation and computational power.

A number of solutions to the problem a two-talker mixture exists.

Some studies into real-time Nonnegative Matrix Factorization (NMF) have provided good results, but don't address window sizes small enough to produce the desired latency performance for hearing aid applications (<20 ms). Likewise, the Probabilistic Latent Component Analysis (PLCA) approach in also claims real-time performance, but operates on frames of length 64 ms, which doesn't satisfy the latency requirements of hearing-aid-users.

Until now, most NMF-based algorithms have been designed to run 'offline', however, i.e. the whole mixture signal to be separated/enhanced is available to the processing algorithm at once.

Although some attempts to provide real-time solutions have been reported, there is a need for a solution that give satisfactory results in a hearing device during normal operation.

SUMMARY

The present disclosure proposes to solve the problem of real-time source separation using a dictionary specific to each source to be separated, and dedicated frame-handling approaches to provide enhanced separation, even for short processing frames (which produce lowest latency). By storing a cache of previous input frames in a circular buffer, filter coefficients for the current frame to be output based on greater temporal context can be derived. Further, better source separation performance for low latency can be produced compared to the use of short input frames alone.

Objects of the application are achieved by the invention described in the accompanying claims and as described in the following.

A Hearing Device:

In an aspect of the present application, an object of the application is achieved by a hearing device comprising

- an input unit for delivering a time varying electric input signal representing an audio signal comprising at least two sound sources,
- a cyclic analysis buffer unit of length A adapted for storing the last A audio samples, and
- a cyclic synthesis buffer unit of length L, where L is smaller than A, adapted for storing the last L audio samples, which are intended to be separated in individual sound sources,
- a database having stored recorded sound examples from said at least two sound sources, each entry (recorded sound example) in the database being termed an atom, the atoms originating from audio samples from first and second buffers corresponding in size to said synthesis and analysis buffer units, where for each atom, the audio samples from the first buffer overlaps with the audio samples from the second buffer, and where atoms originating from the first buffer constitute a reconstruction dictionary, and where atoms originating from the second buffer constitute an analysis dictionary.

The hearing device further comprises, a sound source separation unit for separating said electric input signal to provide at least two separated signals representing said at least two sound sources, the sound source separation unit being configured to determine the most optimal representation (W) of the last A audio samples given the atoms in the analysis dictionary of the database, and to generate said at least two separated signals by combining atoms in the synthesis (reconstruction) dictionary of the database using the optimal representation (W).

The present disclosure is based on the method's ability to enhance the separation of the last L samples from the last A samples, where L<A, and at the same time separate the individual sources (e.g. voices) that were present in the L audio samples. The method calculates a representation of the last A audio samples from the database consisting of (or originating from) recorded examples of length A, the definition of the representation W, e.g., weights for a weighted sum, e.g. as defined by a compositional (e.g. additive) model, is then applied to the recorded examples from the database of length L to provide the current separated signals of the current contents of the synthesis buffer.

In an embodiment, the at least two sound sources comprises at least one target sound source. In an embodiment, the at least two sound sources comprises a noise sound source. In an embodiment, the at least two sound sources comprises a target sound source and a noise sound source. In an embodiment, only a target sound source and a noise sound source is present at a given point in time or time span. In an embodiment, the at least two sound sources comprises two or more different target sound sources. In an embodiment, the at least two sound sources comprises three or more different target sound sources. In the present context, the term 'target sound source' is intended to mean a sound source that the user has an intention to take notice of. In the present context, the term 'target sound source' is intended to mean a sound source for which a learned database exists (comprising analysis and reconstruction dictionaries for use in source separation according to the present disclosure).

In an embodiment, the hearing device comprises a time frequency (TF) conversion unit for providing the contents of said analysis and/or synthesis buffer(s) in a time-frequency representation (k,m). In an embodiment, the time frequency conversion unit provides a time segment of the electric input signal (e.g. on a time frame by time frame basis, e.g. corresponding to the analysis and/or synthesis time frames/buffers) in a number of frequency bands at a number of time instances, k being a frequency band index and m being a time index, and wherein (k, m) defines a specific time-frequency bin or unit comprising a signal component in the form of a complex or real value of the electric input signal corresponding to frequency index k and time instance m. In an embodiment, only the magnitude of the signal is considered. In an embodiment, the TF conversion unit comprises a filter bank for filtering a (time varying) input signal and providing a number of (time varying) output signals each comprising a distinct frequency range of the input signal. In an embodiment, the TF conversion unit comprises a Fourier transformation unit for converting a time variant input signal to a (time variant) signal in the frequency domain, e.g. a Discrete Fourier Transform (DFT). In an embodiment, the frequency range considered by the hearing device from a minimum frequency $f_{min}$ to a maximum frequency $f_{max}$ comprises a part of the typical human audible frequency range from 20 Hz to 20 kHz, e.g. a part of the range from 20 Hz to 12 kHz. In an embodiment, a signal of the forward and/or analysis path of the hearing device is split into a number NI of frequency bands, where NI is e.g. larger than 5, such as larger than 10, such as larger than 50, such as larger than 100, such as larger than 500, at least some of which are processed individually. In an embodiment, the hearing device is/are adapted to process a signal of the forward and/or analysis path in a number NP of different frequency channels (NP≤NI). The frequency channels may be uniform or non-uniform in width (e.g. increasing in width with frequency), overlapping or non-overlapping.

In an embodiment, the atoms of the database are represented in the time domain or in the (time-)frequency domain.

In an embodiment, the hearing device comprises a time-frequency to time conversion unit for providing the time domain representation of the separated sources.

In an embodiment, the sound source separation unit comprises the cyclic analysis and synthesis buffers and/or the time to time-frequency conversion unit and/or the time-frequency to time conversion unit.

In an embodiment, the hearing device comprises a feature extraction unit for extracting characteristic features of the contents of said analysis buffer and/or said synthesis buffer.

In an embodiment, the feature extraction unit is configured to provide said characteristic features in a time-frequency representation. Examples of characteristics could be short examples (say shorter than 100 ms) of sound of the particular sources in the time-frequency domain (as in FIG. 3B, 3C).

In an embodiment, the sound separation unit is configured to base said sound source separation on Non Negative Matrix Factorization (NMF), Hidden Markov Model (HMM), or Deep Neural Networks (DNN).

In an embodiment, each of the recorded sound examples in the database consist of an atom pair originating from audio samples from first and second buffers, respectively, the first and second buffers corresponding in size to the synthesis and analysis buffer units.

In an embodiment, each of the corresponding atom pairs of the database comprises an identifier of the sound source from which it originates, e.g. a name of a person whose voice is represented by a given set of atom pairs, or a type of sound source, or a number of a sound source, e.g. source#1, source#2, etc.

In an embodiment, the database comprises an analysis and a reconstruction dictionary for each sound source. Each atom in the analysis and reconstruction dictionary is associated with a corresponding atom in the other dictionary (originating from, or being characteristic of, the same sound element). In an embodiment, each dictionary or each atom of a dictionary is associated with a specific sound source, e.g. source 1, source 2, source 3.

In an embodiment, the size of the individual dictionaries is reduced by standard data reduction techniques, such as K-means clustering, or by introducing sparsity constraints in the learning of the dictionaries.

In an embodiment, the sound source separation unit is configured to use the identifier of the sound source to generate said at least two sound sources. In an embodiment, the sound source separation unit is configured to use a compositional model to generate said at least two sound sources. In an embodiment, the compositional model comprises an optimization procedure, e.g. a minimization procedure. In an embodiment, the sound source separation unit is configured to minimize a divergence function (e.g. the Kullback-Liebler (KL) divergence) between an observation vector, x, and its approximation, $\hat{x}$.

In an embodiment, the hearing device comprises a control unit for controlling the update of the analysis and synthesis buffers with a predefined update frequency, and configured—at each update—to store in the analysis and synthesis buffers the last H audio samples received from the input unit and discarding the oldest H audio samples stored in the analysis and synthesis buffers. In an embodiment, the number H of audio samples between each update of the analysis and synthesis buffers is less than 16, such as less than 8, such as less than 4, such as less than 2. In an embodiment, the control unit is configured to update the separated signals according to a predefined scheme, e.g. regularly, e.g. with a predefined update frequency $f_{upd}$, e.g. every H audio samples ($f_{upd}$=1/(H*$f_s$), where $f_s$ is the sampling frequency).

In an embodiment, the hearing device comprises a signal processing unit for processing one or more of said separated signals representing said at least two sound sources (or a signal derived therefrom). In an embodiment, the signal processing unit is configured to present the user with one or more of the separated signals, e.g. one after the other, so that information from only a single source $s_i$ is presented at a given time.

In an embodiment, the hearing device is configured to provide a sound source separation with a latency less than or equal to 20 ms between an audio sample entering and leaving the source separation system, e.g. by optimizing the sizes of the synthesis and analysis frame lengths. In an embodiment, the hearing device is configured to dynamically adapt the synthesis and analysis frame lengths, e.g. in dependence of the current acoustic environment (e.g. of the number of sound sources, the ambient noise level, etc.).

In an embodiment, the hearing device (the input unit) comprises an input transducer for converting an input sound to an electric input signal. In an embodiment, the hearing device comprises a directional microphone system adapted to enhance a target acoustic source among a multitude of acoustic sources in the local environment of the user wearing the hearing device. In an embodiment, the hearing device comprises a multitude of input transducers and/or receives one or more direct input signals representing audio. In an embodiment, the hearing device is configured to create a directional signal based on electric input signals from said multitude of input transducers and/or on said one or more direct input signals. In an embodiment, the hearing device is configured to create a directional signal based on at least one of said separated signals. In an embodiment, the hearing device is adapted to receive a microphone signal from another device, e.g. a remote control or a SmartPhone and/or a separate (e.g. partner) microphone. In an embodiment, the other device is a contra-lateral hearing device of a binaural hearing system. In an embodiment, the hearing device is configured to create a directional signal based on at least one of said separated signals and at least one microphone signal received from another device. In an embodiment, the directional system is adapted to detect (such as adaptively detect) from which direction a particular part of the microphone signal originates. This can be achieved in various different ways as e.g. described in the prior art.

In an embodiment, the hearing device is adapted to provide a frequency dependent gain and/or a level dependent compression and/or a transposition (with or without frequency compression) of one or more frequency ranges to one or more other frequency ranges, e.g. to compensate for a hearing impairment of a user. In an embodiment, the hearing device comprises a signal processing unit for enhancing the input signals and providing a processed output signal.

In an embodiment, the hearing device comprises an output unit for providing a stimulus perceived by the user as an acoustic signal based on a processed electric signal. In an embodiment, the output unit comprises a number of electrodes of a cochlear implant or a vibrator of a bone conducting hearing device. In an embodiment, the output unit comprises an output transducer. In an embodiment, the output transducer comprises a receiver (loudspeaker) for providing the stimulus as an acoustic signal to the user. In an embodiment, the output transducer comprises a vibrator for providing the stimulus as mechanical vibration of a skull bone to the user (e.g. in a bone-attached or bone-anchored hearing device).

In an embodiment, the hearing device comprises an antenna and transceiver circuitry for wirelessly receiving a direct electric input signal from another device, e.g. a communication device or another hearing device. In an embodiment, the hearing device comprises a (possibly standardized) electric interface (e.g. in the form of a connector) for receiving a wired direct electric input signal from another device, e.g. a communication device or another hearing device. In an embodiment, the direct electric input signal represents or comprises an audio signal and/or a control signal and/or an information signal.

In an embodiment, the hearing device has a maximum outer dimension of the order of 0.08 m (e.g. a head set). In an embodiment, the hearing device has a maximum outer dimension of the order of 0.04 m (e.g. a hearing instrument).

In an embodiment, the hearing device is portable device, e.g. a device comprising a local energy source, e.g. a battery, e.g. a rechargeable battery. In an embodiment, the hearing device is a low power device.

In an embodiment, the hearing device comprises a forward or signal path between an input transducer (microphone system and/or direct electric input (e.g. a wireless receiver)) and an output transducer. In an embodiment, the signal processing unit is located in the forward path. In an embodiment, the signal processing unit is adapted to provide a frequency dependent gain according to a user's particular needs. In an embodiment, the hearing device comprises an analysis path comprising functional components for analyzing the input signal (e.g. determining a level, a modulation, a type of signal, an acoustic feedback estimate, etc.). In an embodiment, some or all signal processing of the analysis path and/or the signal path is conducted in the frequency domain. In an embodiment, some or all signal processing of the analysis path and/or the signal path is conducted in the time domain.

In an embodiment, the hearing devices comprise an analogue-to-digital (AD) converter to digitize an analogue input with a predefined sampling rate, e.g. 20 kHz. In an embodiment, the hearing devices comprise a digital-to-analogue (DA) converter to convert a digital signal to an analogue output signal, e.g. for being presented to a user via an output transducer.

In an embodiment, an analogue electric signal representing an acoustic signal is converted to a digital audio signal in an analogue-to-digital (AD) conversion process, where the analogue signal is sampled with a predefined sampling frequency or rate $f_s$, $f_s$ being e.g. in the range from 8 kHz to 40 kHz (adapted to the particular needs of the application) to provide digital samples $x_n$ (or x[n]) at discrete points in time $t_n$ (or n), each audio sample representing the value of the acoustic signal at $t_n$ by a predefined number $N_s$ of bits, $N_s$ being e.g. in the range from 1 to 16 bits. A digital sample x has a length in time of $1/f_s$, e.g. 50 μs, for $f_s$=20 kHz. In an embodiment, a number of audio samples are arranged in a time frame. In an embodiment, a time frame comprises 64 audio data samples (corresponding to 3.2 ms for $f_s$=20 kHz). Other frame lengths may be used depending on the practical application.

In an embodiment, the hearing device comprises a classification unit for classifying a current acoustic environment around the hearing device. In an embodiment, the hearing device comprises a number of detectors providing inputs to the classification unit and on which the classification is based.

In an embodiment, the hearing device comprises a level detector (LD) for determining the level of an input signal (e.g. on a band level and/or of the full (wide band) signal). The input level of the electric microphone signal picked up from the user's acoustic environment is e.g. a classifier of the environment. In an embodiment, the level detector is adapted to classify a current acoustic environment of the user according to a number of different (e.g. average) signal levels, e.g. as a HIGH-LEVEL or LOW-LEVEL environment.

In a particular embodiment, the hearing device comprises a voice detector (VD) for determining whether or not an input signal comprises a voice signal (at a given point in time). A voice signal is in the present context taken to include a speech signal from a human being. It may also include other forms of utterances generated by the human speech system (e.g. singing). In an embodiment, the voice detector unit is adapted to classify a current acoustic environment of the user as a VOICE or NO-VOICE environment. This has the advantage that time segments of the electric microphone signal comprising human utterances (e.g. speech) in the user's environment can be identified, and thus separated from time segments only comprising other sound sources (e.g. artificially generated noise). In an embodiment, the voice detector is adapted to detect as a VOICE also the user's own voice. Alternatively, the voice detector is adapted to exclude a user's own voice from the detection of a VOICE. In an embodiment, the hearing device comprises a noise level detector.

In an embodiment, the hearing device comprises an own voice detector for detecting whether a given input sound (e.g. a voice) originates from the voice of the user of the system. In an embodiment, the microphone system of the hearing device is adapted to be able to differentiate between a user's own voice and another person's voice and possibly from NON-voice sounds.

In an embodiment, the hearing device comprises an acoustic (and/or mechanical) feedback suppression system, e.g. an adaptive feedback cancellation system having has the ability to track feedback path changes over time.

In an embodiment, the hearing device further comprises other relevant functionality for the application in question, e.g. level compression, noise reduction, etc.

In an embodiment, the hearing device comprises a listening device, e.g. a hearing aid, e.g. a hearing instrument, e.g. a hearing instrument adapted for being located at the ear or fully or partially in the ear canal of or to be fully or partially implanted in the head of a user, a headset, an earphone, an ear protection device or a combination thereof.

In an embodiment, the functional components of the hearing device according to the present disclosure are enclosed in a single device e.g. a hearing instrument. In an embodiment, functional components of the hearing device according to the present disclosure are enclosed in a several separate devices (e.g. two or more). In an embodiment, the several (preferably portable) separate devices are adapted to be in wired or wireless communication with each other. In an embodiment, at least a part of the processing related to sound separation is performed in a separate (auxiliary) device, e.g. a portable device, e.g. a remote control device, e.g. a cellular telephone, e.g. a SmartPhone.

Use:

In an aspect, use of a hearing device as described above, in the 'detailed description of embodiments' and in the claims, is moreover provided. In an embodiment, use is provided in a system comprising one or more hearing instruments, headsets, ear phones, active ear protection systems, etc., e.g. in handsfree telephone systems, teleconferencing systems, public address systems, karaoke systems, classroom amplification systems, etc.

A Method:

In an aspect, a method of separating sound sources in a multi-sound-source environment is furthermore provided by the present application. The method comprises

- providing a time varying electric input signal representing an audio signal comprising at least two sound sources,
- providing a cyclic analysis buffer unit of length A adapted for storing the last A audio samples, and
- providing a cyclic synthesis buffer unit of length L, where L is smaller than A, adapted for storing the last L audio samples, which are intended to be separated in individual sound sources,
- providing a database having stored recorded sound examples from said at least two sound sources, each entry (recorded sound example) in the database being termed an atom, the atoms originating from audio samples from first and second buffers corresponding in size to said synthesis and analysis buffer units, where for each atom, the audio samples from the first buffer overlaps with the audio samples from the second buffer, and where atoms originating from the first buffer constitute a reconstruction dictionary, and where atoms originating from the second buffer constitute an analysis dictionary, and
- separating said electric input signal to provide separated signals representing said at least two sound sources by determining the most optimal representation (W) of the last A audio samples given the atoms in the analysis dictionary of the database, and to generate said separated signals by combining atoms in the synthesis (reconstruction) dictionary of the database using the optimal representation (W).

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

In order to obtain low algorithmic latency, the method (algorithm) is applied on relatively short incoming data frames (synthesis frames), whilst the filter weights are established by examining relatively longer previous temporal context (analysis frames). Since two different frame sizes are used to gather time-domain data for processing, two different atom lengths exist across the coupled dictionaries used in the additive (compositional) model. For each source, a separate dictionary for the purposes of analysis and reconstruction, respectively, is therefore created.

An incoming audio mixture signal is analyzed and processed in a frame-based manner, e.g. with feature vectors derived from each time domain frame. Separation is performed by representing feature vectors with a compositional model, where the atoms in each dictionary sum non-negatively to approximate the spectral features of the sources within the mixture. Individual dictionary atoms therefore have the same dimensions as the feature vectors formed from the mixture signal, which are either analyzed or filtered in terms of the dictionary contents.

The present disclosure further relates to a method of creating a database comprising separate coupled analysis and reconstruction dictionaries for each of the sound sources to be separated.

A Computer Readable Medium:

In an aspect, a tangible computer-readable medium storing a computer program comprising program code means for causing a data processing system to perform at least some (such as a majority or all) of the steps of the method described above, in the 'detailed description of embodiments' and in the claims, when said computer program is executed on the data processing system, is furthermore provided by the present application.

By way of example, and not limitation, such tangible computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium. Such activity is also intended to be covered by the present disclosure and claims.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing device as described above, in the 'detailed description of embodiments', and in the claims, AND an auxiliary device is moreover provided.

In an embodiment, the system is adapted to establish a communication link between the hearing device and the auxiliary device to provide that information (e.g. data, such as control and/or status signals, intermediate results, and/or audio signals) can be exchanged between them or forwarded from one to the other.

In an embodiment, the communication link is a link based on near-field communication, e.g. an inductive link based on an inductive coupling between antenna coils of transmitter and receiver parts. In another embodiment, the wireless link is based on far-field, electromagnetic radiation. In an embodiment, the communication via the wireless link is arranged according to a specific modulation scheme, e.g. an analogue modulation scheme, such as FM (frequency modulation) or AM (amplitude modulation) or PM (phase modulation), or a digital modulation scheme, such as ASK (amplitude shift keying), e.g. On-Off keying, FSK (frequency shift keying), PSK (phase shift keying) or QAM (quadrature amplitude modulation). Preferably, frequencies used to establish a communication link between the hearing device and the other device is below 70 GHz, e.g. located in a range from 50 MHz to 50 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). In an embodiment, the wireless link is based on a standardized or proprietary technology. In an embodiment, the wireless link is based on Bluetooth technology (e.g. Bluetooth Low-Energy technology).

In an embodiment, the auxiliary device is or comprises an audio gateway device adapted for receiving a multitude of audio signals and adapted for allowing the selection of an appropriate one of the received audio signals (or a combination of selected signals) for transmission to the hearing device. In an embodiment, the auxiliary device is or comprises a remote control for controlling functionality and operation of the hearing device(s). In an embodiment, the function of a remote control is implemented in a SmartPhone, the SmartPhone possibly running an APP allowing to control the functionality of the audio processing device via the SmartPhone (the hearing device(s) comprising an appropriate wireless interface to the SmartPhone, e.g. based on Bluetooth or some other standardized or proprietary scheme).

In an embodiment, the auxiliary device is or comprises another hearing device. In an embodiment, the auxiliary device is or comprises a hearing device as described above, in the detailed description of embodiments and in the claims. In an embodiment, the hearing system comprises two hearing devices adapted to implement a binaural hearing system, e.g. a binaural hearing aid system.

Definitions

In the present context, a 'hearing device' refers to a device, such as e.g. a hearing instrument or an active ear-protection device or other audio processing device, which is adapted to improve, augment and/or protect the hearing capability of a user by receiving acoustic signals from the user's surroundings, generating corresponding audio signals, possibly modifying the audio signals and providing the possibly modified audio signals as audible signals to at least one of the user's ears. A 'hearing device' further refers to a device such as an earphone or a headset adapted to receive audio signals electronically, possibly modifying the audio signals and providing the possibly modified audio signals as audible signals to at least one of the user's ears. Such audible signals may e.g. be provided in the form of acoustic signals radiated into the user's outer ears, acoustic signals transferred as mechanical vibrations to the user's inner ears through the bone structure of the user's head and/or through parts of the middle ear as well as electric signals transferred directly or indirectly to the cochlear nerve of the user.

The hearing device may be configured to be worn in any known way, e.g. as a unit arranged behind the ear with a tube leading radiated acoustic signals into the ear canal or with a loudspeaker arranged close to or in the ear canal, as a unit entirely or partly arranged in the pinna and/or in the ear canal, as a unit attached to a fixture implanted into the skull bone, as an entirely or partly implanted unit, etc. The hearing device may comprise a single unit or several units communicating electronically with each other.

More generally, a hearing device comprises an input transducer for receiving an acoustic signal from a user's surroundings and providing a corresponding input audio signal and/or a receiver for electronically (i.e. wired or wirelessly) receiving an input audio signal, a signal processing circuit for processing the input audio signal and an output means for providing an audible signal to the user in dependence on the processed audio signal. In some hearing devices, an amplifier may constitute the signal processing circuit. In some hearing devices, the output means may comprise an output transducer, such as e.g. a loudspeaker for providing an air-borne acoustic signal or a vibrator for providing a structure-borne or liquid-borne acoustic signal. In some hearing devices, the output means may comprise one or more output electrodes for providing electric signals.

In some hearing devices, the vibrator may be adapted to provide a structure-borne acoustic signal transcutaneously or percutaneously to the skull bone. In some hearing devices, the vibrator may be implanted in the middle ear and/or in the inner ear. In some hearing devices, the vibrator may be adapted to provide a structure-borne acoustic signal to a middle-ear bone and/or to the cochlea. In some hearing devices, the vibrator may be adapted to provide a liquid-borne acoustic signal to the cochlear liquid, e.g. through the oval window. In some hearing devices, the output electrodes may be implanted in the cochlea or on the inside of the skull bone and may be adapted to provide the electric signals to the hair cells of the cochlea, to one or more hearing nerves, to the auditory cortex and/or to other parts of the cerebral cortex.

A 'hearing system' refers to a system comprising one or two hearing devices, and a 'binaural hearing system' refers to a system comprising one or two hearing devices and being adapted to cooperatively provide audible signals to both of the user's ears. Hearing systems or binaural hearing systems may further comprise 'auxiliary devices', which communicate with the hearing devices and affect and/or benefit from the function of the hearing devices. Auxiliary devices may be e.g. remote controls, audio gateway devices, mobile phones, public-address systems, car audio systems or music players. Hearing devices, hearing systems or binaural hearing systems may e.g. be used for compensating for a hearing-impaired person's loss of hearing capability, augmenting or protecting a normal-hearing person's hearing capability and/or conveying electronic audio signals to a person.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

(FIG. 1B), FIG. 2 schematically shows an embodiment of the learning process part of a source separation scheme according to the present disclosure, FIGS. 3A-3C schematically illustrate three embodiments of coupled dictionaries (or database) according to the present disclosure, FIG. 3A showing an embodiment where the atoms are in the time domain, FIG. 3B showing an embodiment where the atoms are in the time-frequency domain, and FIG. 3C showing an embodiment, where the atoms of the coupled dictionaries are partly in the time domain and partly in the time-frequency domain.

The figures are schematic and simplified for clarity, and they just show details which are essential to the understanding of the disclosure, while other details are left out. Throughout, the same reference signs are used for identical or corresponding parts.

Figure 1A:
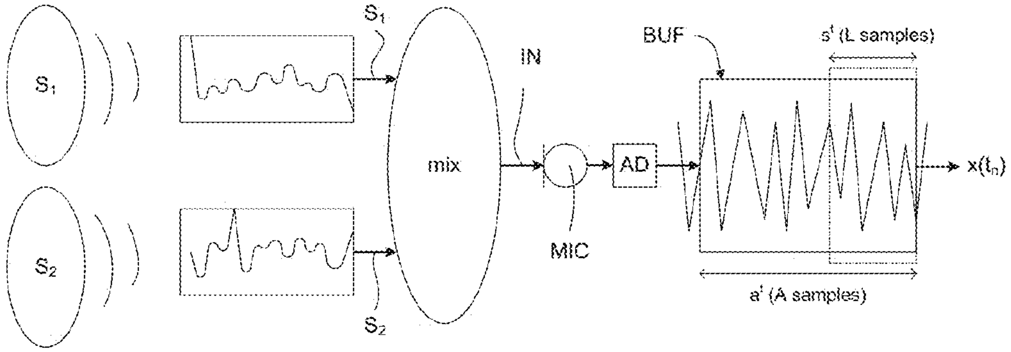
FIGS. 1A-1B schematically show the mixing of two audio sources to a common sound field that is picked up by a microphone and converted to an electrical, digitized signal and stored in two buffers ($a^r$, $s^r$), where the $a^r$ buffer is at least as long as the $s^r$ buffer (FIG. 1A), and the principle of acoustic source separation with two sources (e.g. voices) based on pre-learned analysis and synthesis (reconstruction) dictionaries according to the present disclosure for each source.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include microprocessors, microcontrollers, digital signal processors (DSPs), field programmable gate arrays (FPGAs), programmable logic devices (PLDs), gated logic, discrete hardware circuits, and other suitable hardware configured to perform the various functionality described throughout this disclosure. The term 'computer program' shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Sound source separation through approximation using linear models has been shown to be effective, see e.g. references [1]-[5]. The spectral magnitude of a mixture is approximated through weighted summation of components, which are stored within pre-trained dictionaries, each modeling a specific sound source, with the contributions from each dictionary being used to produce a Wiener filter which is applied to the mixture spectrogram to isolate that source.

Assume a collection of N dictionaries, were each individual dictionary models the characteristics of a given sound source, e.g. dictionaries for a number of known voices. The dictionary for source n consist of $K_n$ atoms $d_k^n$, with k as the atom number within the dictionary. Each atom $d_k^n$ can be a consecutive number of sound (audio) samples, the frequency domain representation of the same consecutive number of sound samples, or the time frequency domain representation of the same consecutive number of sound samples. The values can be real for sound samples and time frequency representations as well as complex values for time frequency representations. The atoms $d_k^n$ are termed $a_{ndi}$ and $s_{ndi}$ in connection with the description of FIG. 2, 3 below (where n is the source index, as above, and i is the atom number (corresponding to k in $d_k^n$)).

Consider the case where an observation of consecutive audio samples x contains sounds originating from one or more sources for which the individual dictionaries have been trained. The observation is modelled as a weighted summation of the atoms in the database.

The frame is modelled as a sum of dictionary 'atoms' $d_k^n$ the frequency representations of known examples of that sound source $d_k^n$, such that the non-negative weights $w_k^n$ of the atoms $d_k^n$ are estimated in the below equation (1) defining an exemplary compositional model:

$$\hat{x} = \sum_{n=1}^{N} \hat{x}_n = \sum_{n=1}^{N} \sum_{k=1}^{K_n} w_n^k d_n^k \quad \text{Eq. (1)}$$

The separation is achieved by finding the optimal weights $w_n^k$, for all atoms of the database followed and reconstructing each source as the weighted sum of atoms corresponding to that source. The weights estimation is performed by minimizing a cost function, this could be the Kullback-Leibler (KL) divergence between the observation x and the estimation $\hat{x}$, and furthermore the cost function could include sparsity constraints within source dictionaries and between source dictionaries.

Finally, Switching to matrix notation Equation (1) can be rewritten as:

$$\hat{x} = Dw \quad \text{Eq. (2)}$$

where the dictionaries matrix D is partitioned $$D = [D_1 D_2 \ldots D_N] \quad \text{Eq. (3)}$$

with $D_n$ containing atoms trained on source n. The weights pertaining to each source are notated $w_n$, and the model can be described as:

$$\hat{x} = [\, D_1 D_2 \; \ldots \; D_N \,] \begin{bmatrix} w_1 \\ w_2 \\ \ldots \\ w_N \end{bmatrix} \quad \text{Eq. (4)}$$

Sources are separated using the above compositional model (e.g. Eq. (1)) in the following way. If the complex-valued observation vector to be separated is y, then the separated contribution of the source n, $s_n$ is extracted directly from atoms or by filtering $$s_n = D_n w_n \quad \text{Eq. (5)}$$

or

-continued $$s_n = y \otimes \frac{D_n w_n}{\sum_{n=1}^{N} D_n w_n}$$

using the appropriate dictionary and weights in the numerator of Equation 5 (the symbol '$\otimes$' denoting convolution). The later, operation can be considered a Wiener filter in the frequency domain, and the optional normalization ensures that reconstructed source estimates sum to the original mixture.

For low-latency systems, the time-delay between audio samples being available for processing and being output as audio should be as low as possible. In frame-based processing schemes, a whole frame of data must be collected and stored before it can be processed for output. We refer to the theoretical minimal delay between a sample incoming into the algorithm and being processed and available for output as 'algorithmic latency', $T_a$, whereas the actual processing time can be called 'computational latency', $T_c$. The overall achievable latency T is the sum of these values:

$$T = T_a + T_c \quad \text{Eq. (6)}$$

We consider only the constraints of realizing low algorithmic latency, since depending on the parameters of a particular processing scheme, hardware etc., time latency is non-deterministic.

Since synthesis frames are processed in a block-based manner, a whole frame of input must be captured before the first sample can be output. From a purely algorithmic perspective, sample output can occur as soon as a frame has been processed, regardless of frame overlap. The algorithmic latency of such an approach is therefore the synthesis frame length. Practically, any processing overhead adds to the actual minimal latency.

Computational complexity is reduced for non-overlapping frames, but this can result in discontinuities between the last sample of one output frame and the first sample of the next. Greater overlap provides more information which should provide better separation quality than non-overlapping frames.

In an embodiment, a windowing function, e.g. Hanning window, has preferably been applied prior to any Fourier transform, e.g. Discrete Fourier Transform (DFT), on all vectors (a and s) to provide temporal smoothing and adjust the amount of frequency overlap. This is omitted from the rest of the description for clarity.

In order to obtain low algorithmic latency, the algorithm is applied on short incoming data frames, whilst the filter weights are established by examining longer previous temporal context. Since two different frame sizes are used to gather time-domain data for processing, two different atom lengths exist (see e.g. $s_{di}$ and $a_{di}$, respectively, in FIG. 3) across the coupled dictionaries used in the additive model. For each source, a separate dictionary for the purposes of analysis and reconstruction is therefore created.

An incoming audio mixture signal is analyzed and processed in a frame-based manner, with feature vectors derived from each time domain frame. Separation is performed by representing feature vectors with a compositional model, where the atoms in each dictionary sum non-negatively to approximate the spectral features of the sources within the mixture. Individual dictionary atoms therefore have the same dimensions as the feature vectors formed from the mixture signal, which are either analyzed or filtered in terms of the dictionary contents.

For clarity, time domain frame lengths and feature vectors derived from them are defined in the following (in general, variables are summarized in the Symbols table at the end of the description). We refer to the frame data, which are processed for the purposes of separated source reconstruction as the synthesis frame $s^t$ of length L. An analysis buffer $a^t$ of previous incoming audio samples, length A, is maintained (where A>L) and referred to as the 'analysis frame'. The temporal context from which the filters to be applied to the processing frame can be derived from the analysis buffer. Furthermore, either or both analysis and synthesis buffers can be further subdivided.

In an embodiment, the analysis feature vector, y, is formed from $a^t$ by taking the absolute value of the DFT (see |DFT| in FIG. 2) of analysis sub-frames of length L with 50% overlap, and concatenating the resulting (2(A/L)−1) sub-frame outputs into a single feature vector. The vector effectively describes the magnitude of frequencies present during the past A audio samples (see FIG. 2). The same size of $s_t$ and sub-frames in $a_t$ is assumed for clarity. The sub-frames in $a_t$ do indeed not need to have same length as $s_t$. The complex-valued frequency-domain synthesis vector s is formed by taking only the positive frequencies of the DFT result of real-valued data in $s^t$, and so has length (L/2)+1. s is filtered at each frame output to produce the separated source estimates (see $s_1$ and $s_2$ in FIG. 1B).

Figure 1B:
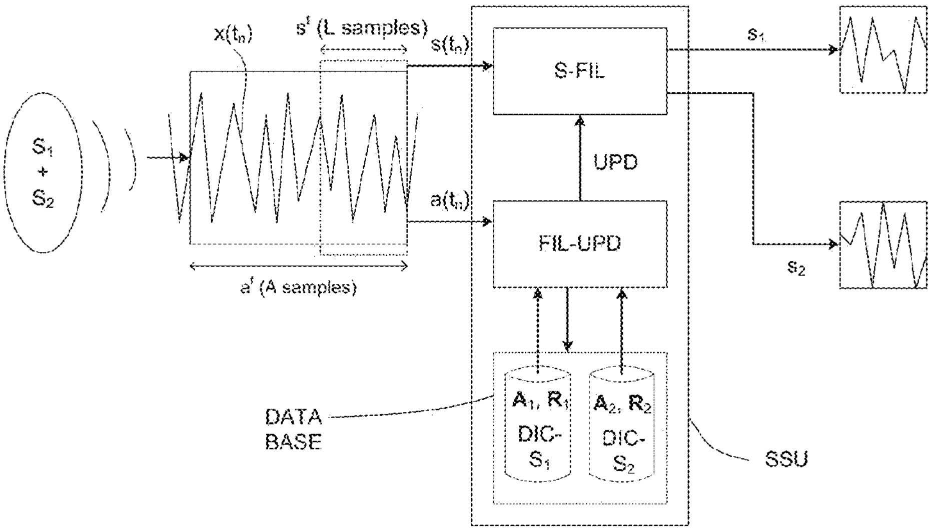

For additive model based separation, a dictionary of atoms is typically learned for each speaker in the mixture (see DIC-$S_1$ and DIC-$S_2$ in FIG. 1B). The use of coupled dictionaries for each talker is proposed in the present disclosure (see FIG. 3), whereby a dictionary of longer analysis atoms ($a_{di}$, i=1, 2, . . . , $N_D$, in FIG. 3) is produced alongside a dictionary of shorter synthesis atoms ($s_{di}$, i=1, 2, . . . , $N_D$, in FIG. 3) for source reconstruction.

Explicitly, in a 2-talker mixture model, one dictionary A for analysis and one dictionary R for reconstruction may advantageously be used. Each dictionary comprises talker-specific regions as indicated in Equation 3. The portion of a dictionary trained on source n is notated by the subscript n, e.g. $A_n$, and thus:

$$A=[A_1A_2] \quad \text{Eq. (7)}$$

and $$R=[R_1R_2] \quad \text{Eq. (8)}$$

The $k^{th}$ atom in each dictionary is coupled to the atom at the same index in the alternate dictionary (cf. e.g. dotted lines from $s_{di}$ to $a_{di}$ in FIG. 3), as indicated by the following expression, $$R_{:,k} \Leftrightarrow A_{:,k} \quad \text{Eq. (9)}$$

by the fact that each was obtained from similar portions of training data (where the analysis atoms $a_{di}$ are taken from a longer previous context than synthesis atoms $s_{di}$). The notation $R_{:,k}$ ($A_{:,k}$) is intended to refer to the $k^{th}$ column of dictionary R (A).

Figure 2:
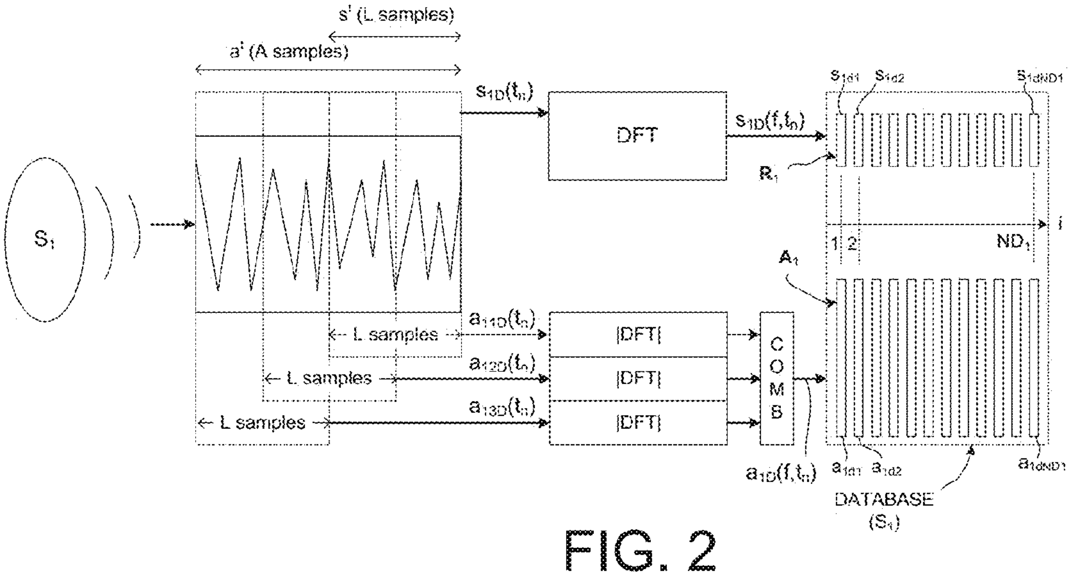

The actual dictionary atom creation process is similar to that of feature vector creation depicted in FIG. 2. Analysis dictionary atoms are obtained by the same processing as to produce feature vector y. Reconstruction dictionary atoms are created similarly to s, except that the real-valued absolute value of the DFT result is stored, as opposed to the complex-valued result present in each s.

Atoms in A are formed from time domain data of length A whilst L audio samples are used to form atoms in reconstruction dictionary R. The atoms in A are used to estimate the weights applied to atoms in R, in order to form the frequency-domain Wiener filters applied to the complex-valued synthesis frame s (see filter unit S-FIL in FIG. 1B).

Analysis is performed by learning the weights w which minimize KL-divergence between analysis vector y and a weighted sum of atoms from dictionary A (Equation 10).

$$\min_{d} f(d) = KL(Y||Aw) \quad \text{Eq. (10)}$$

In an embodiment, the Active-Set Newton Algorithm (ASNA) algorithm is employed (cf. e.g. [6, 7]) to find the optimal solution due to its rapid computation time and guaranteed convergence, although NMF-based approaches could equally well be used, and may offer speed advantages on GPU-based processor architectures.

The learned weights w are applied to the corresponding coupled dictionary atoms in dictionary R to form the reconstruction Wiener filters. Filters are applied to the synthesis vector s at each frame processing step so that for each synthesis frame the $n^{th}$ separated source is reconstructed:

$$s_n = s \otimes \frac{R_n w_n}{\sum_n R_n w_n} \quad \text{Eq. (11)}$$

The separated time-domain sources are reconstructed by generating complex conjugates of Sn and performing the inverse DFT for each frame to be overlap-add and reconstructed into a continuous time output.

FIGS. 1A-1B illustrates the environmental mixing (mix) in FIG. 1A of two audio sources $S_1$, $S_2$ to a common sound field that is picked up by a microphone (or a microphone system, e.g. a microphone array) and converted to an electrical, digitized signal and stored in two buffers where the analysis buffer ($a^t$) is at least as long as the synthesis buffer ($s^t$) (FIG. 1A). In FIG. 1B the principle of acoustic source separation with two sound sources (e.g. two voices) $S_1$, $S_2$ based on pre-learned analysis and synthesis (reconstruction) dictionaries DIC-$S_1$, and DIC-$S_2$ according to the present disclosure for each source $S_1$, and $S_2$, respectively.

In FIG. 1A, the mixture of sound sources $S_1$, $S_2$ is represented by sound signal IN, which is picked up by input transducer (here microphone) MIC. The analogue electric input signal is sampled with a predefined sampling frequency $f_s$, e.g. 20 kHz, in analogue to digital converter AD providing digital audio samples to cyclic analysis and synthesis buffers BUF as relatively longer analysis frame $a^t$ (comprising A audio samples) and relatively shorter synthesis buffer $s^t$ (comprising L<A audio samples). The resulting digitized electric input signal x at time instance $t_n$ is denoted $x(t_n)$ in—FIGS. 1A-1B.

In FIG. 1B, the digitized electric output signals of analysis and synthesis buffers $a^t$ and $s^t$, signals $a(t_n)$ and $s(t_n)$, respectively, are fed to a sound source separation unit (SSU) for separating the electric input signal $s(t_n)$ to provide separated signals ($s_1$, $s_2$) representing the two sound sources ($S_1$, $S_2$). The sound source separation unit (SSU) is configured to determine the most optimal representation (W) of the last A audio samples given the atoms in the analysis dictionaries ($A_1$, $A_2$) of the database (DATABASE), and to generate the at least two sound source signals ($s_1$, $s_2$) by combining atoms in the respective synthesis (reconstruction) dictionaries ($R_1$, $R_2$) of the database (DATABASE) using the optimal representation (W) determined from the analysis dictionaries ($A_1$, $A_2$). The sound source separation unit (SSU) comprises synthesis filter (S-FIL) for generating the two separated sound source signals ($s_1$, $s_2$) from the electric inputs signal $s(t_n)$ using filter weights ($w_i$) provided by filter update unit (FIL-UPD). The forwarding of the last L input audio samples to S-FIL is optional, but enables the S-FIL unit to compare the separated output with the current input.

The arrows from DIC-$S_1$, DIC-$S_2$ to the filter update unit (FIL-UPD) is intended to indicate the transfer of the analysis and synthesis atoms from source dictionaries DIC-$S_1$, DIC-$S_2$ to the filter update unit. The analysis atoms are used (in the filter update unit) for finding the weights. The weights are used with the corresponding synthesis atoms and delivered to filter unit (S-FIL) to generate source separated signals ($s_1$, $s_2$).

FIG. 2 shows an embodiment of the learning process part of a source separation scheme according to the present disclosure. The source separation scheme is based on a compositional model (cf. e.g. eq. (1)) and coupled dictionaries ($R_1$, $A_1$) comprising basic elements of each sound source to be separated (e.g. speech from different persons), e.g. in the form of spectral feature vectors for the sound sources in question. In FIG. 2, the generation of analysis and synthesis (reconstruction) dictionaries ($A_1$, $R_1$) for sound source $S_1$ is illustrated. The contents of a specific synthesis frame $s_{1D}(t_n)$ (here taken at time $t_n$, but it is the contents of the time frame that matters, not its tome index) is transformed into the frequency domain by DFT-unit (DFT) providing frequency domain atom $s_{1D}(f,t_n)$, e.g. $s_{1di}$ in the synthesis (reconstruction) dictionary $R_1$ (see e.g. FIG. 3B). Likewise, the contents of a specific analysis frame $a_{1D}(t_n)$ (here represented by overlapping sub-frames $a_{11D}(t_n)$, $a_{12D}(t_n)$, $a_{13D}(t_n)$) is transformed into the frequency domain by respective DFT-units (|DFT|) and combined by combination unit COMB to frequency domain atom $a_{1D}(f,t_n)$, e.g. $a_{1di}$ in the analysis dictionary $A_1$ (see e.g. FIG. 3B).

FIG. 2 illustrates an embodiment of the learning process of the analysis and synthesis buffers according to the present disclosure. No source separation takes place in FIG. 2. The learning procedure is preferably performed prior to normal use of the hearing device. The element number (across the dictionary atoms ($s_{1d1}$, $s_{1d2}$, . . . , $s_{1dnD1}$) and ($a_{1d1}$, $a_{2d2}$, . . . , $a_{1dnD1}$) in each database, over 'atom-index' i=1, 2, . . . , $ND_1$, where $ND_1$ is the number of (coupled) atoms in dictionaries $A_1$, $R_1$ for sound source $S_1$) do not imply a time dependency. In a further step (not shown) 'K-means' or other data reduction methods (cluster analysis) are applied to elements in the database.

The length L of the synthesis buffer $s^t$ is shown to be, but does not need to be identical to the length of the overlapping sub-frames $a_{11D}$, $a_{12D}$, $a_{13D}$ of the analysis buffer. It is preferable with a certain overlap between the sub-frames to minimize artifacts from one frame to the next (when spectral analysis form part of the source separation). In the example shown in FIG. 2, three individual frames of length L audio samples have a 50% overlap with each of its neighbouring frames in the analysis buffer.

Without loss of generality it is also possible to subdivide the synthesis buffer into overlapping frames in a similar manner to the analysis buffer.

When the synthesis frame is shorter than, say 20 ms, it is further expected that an improvement in performance of the source separation is achieved through use of an analysis frame which is longer than the synthesis frame. In general, using larger dictionaries produces better separation performance than shorter frames, as does using longer reconstruction windows. Where an advantage is gained by use of a longer analysis frame than synthesis frame, the level of improvement reduces as the analysis frame becomes significantly longer than the synthesis frame. For a particular synthesis window length, greatest performance increases are generally achieved when the analysis window is 2-4 times longer.

It is the insight of the present inventors that the use of two dictionaries (A, R) pr. source reduces the delay of the separation procedure. Previous methods (e.g. Virtanen et al., references [6]+[7]) only used one dictionary pr. source and thus could not achieve the same quality with same short delay below, say 20 ms.

Figure 3A:
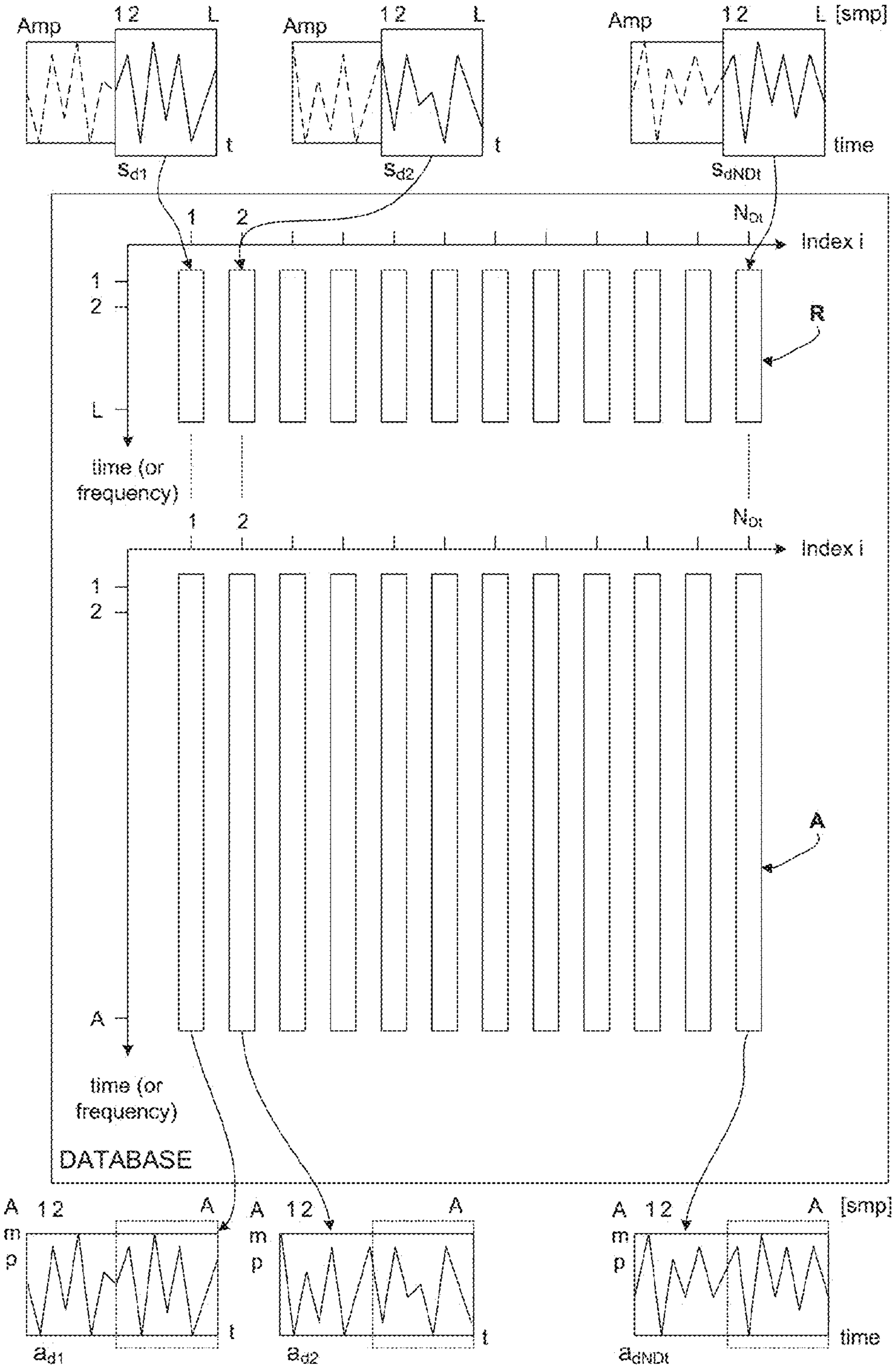
Figure 3B:
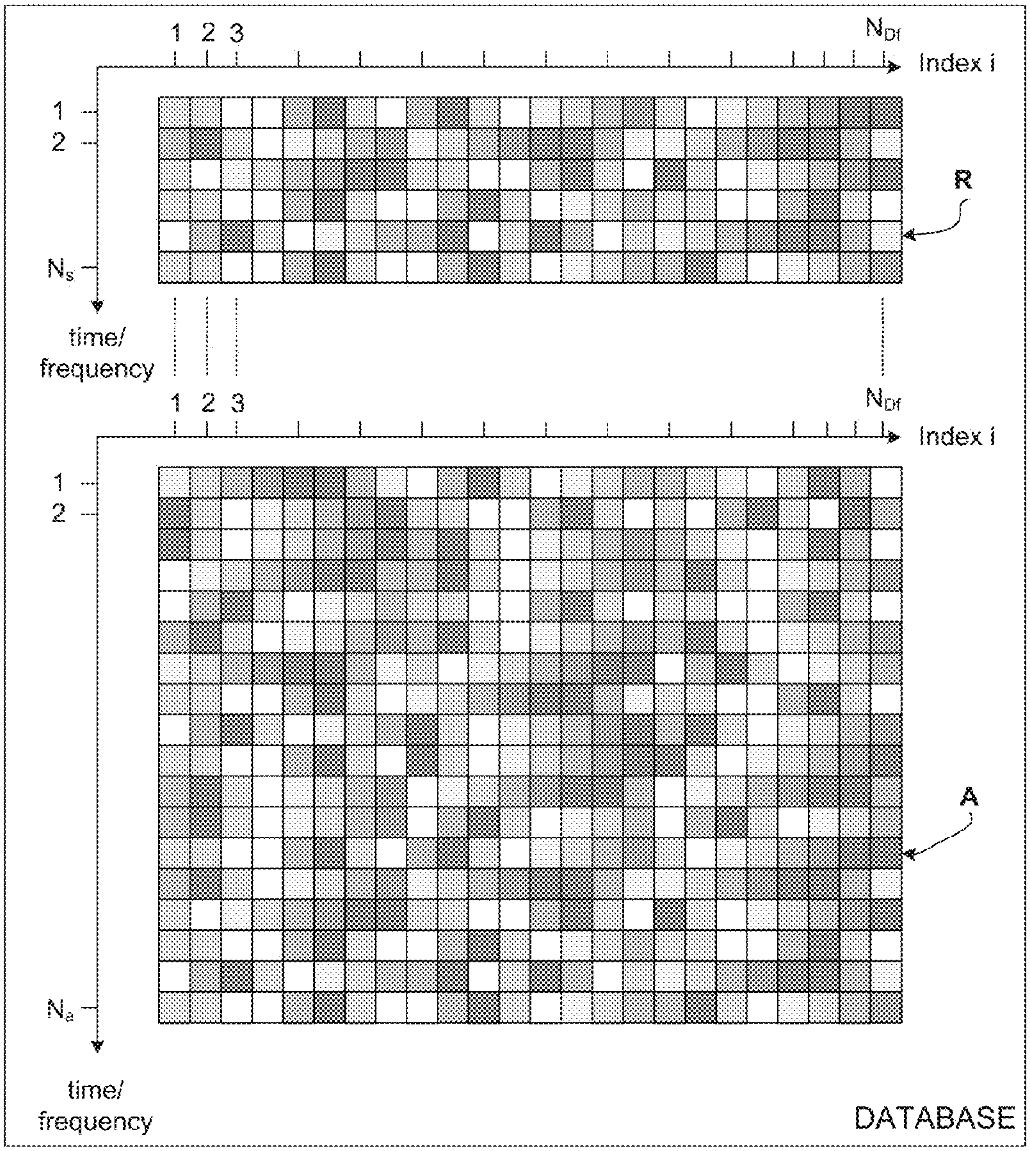
Figure 3C:
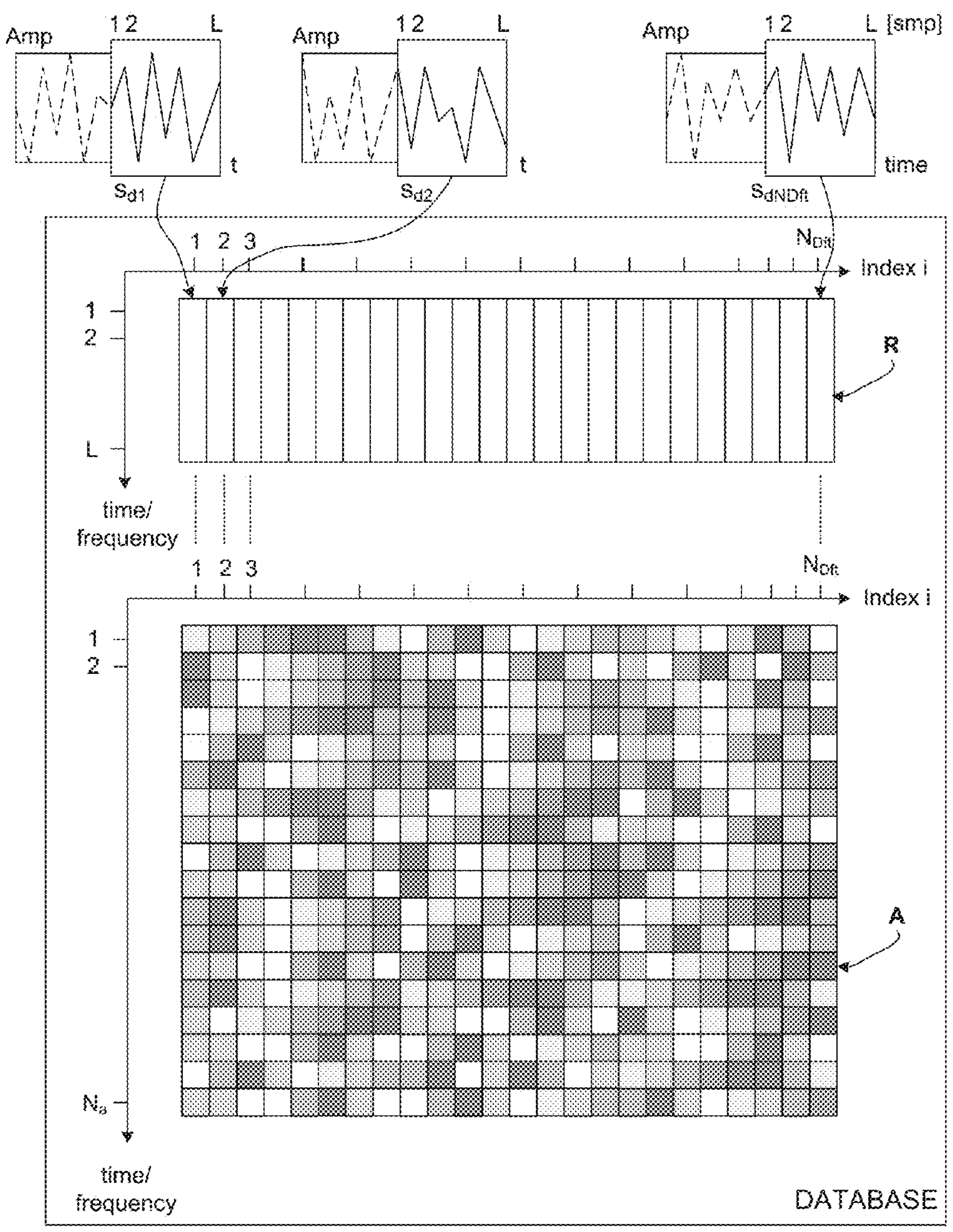

FIGS. 3A-3C illustrates three embodiments of coupled dictionaries (DATABASE) according to the present disclosure. The coupling between analysis atoms $a_{di}$ and synthesis atoms $s_{di}$ having the same index i is indicated by the dotted vertical lines (indicated between analysis atoms $a_{di}$ and synthesis atoms $s_{di}$, for i=1, 2, and $N_{Dt}/N_{Df}/N_{Dft}$).

FIG. 3A shows an embodiment where the atoms of the two dictionaries (A, R) are all in the time domain. The synthesis (reconstruction) dictionary R consists of $N_{Dt}$ synthesis atoms $s_{di}$, consisting of time domain frames of length L audio samples. Three examples of synthesis atoms $s_{di}$, (i=1, 2, $N_{Dt}$) are shown in the top part of the drawing. The analysis dictionary A consists of $N_{Dt}$ synthesis atoms $a_{di}$, consisting of time domain frames of length A audio samples. Three examples of analysis atoms $a_{di}$, (i=1, 2, $N_{Dt}$) are shown in the bottom part of the drawing.

FIG. 3B shows an embodiment where the atoms of the two dictionaries (A, R) are all in the time-frequency domain. The synthesis (reconstruction) dictionary R consists of $N_{Df}$ synthesis atoms $s_{di}$, each consisting of a frequency domain spectrum of length $N_s$ ($N_s$ frequency bands). The analysis dictionary A consists of $N_{Df}$ analysis atoms $a_{di}$, each consisting of a frequency domain spectrum of length $N_a$ ($N_a$ frequency bands, e.g. corresponding to the spectra of a number of consecutive time frames, e.g. A/L).

FIG. 3C shows an embodiment, where the atoms of the coupled dictionaries are partly in the time domain (synthesis (reconstruction) dictionary R) and partly in the time-frequency domain (analysis dictionary A). The synthesis (reconstruction) dictionary R consists of $N_{Dft}$ synthesis atoms $s_{di}$, consisting of time domain frames of length L audio samples. Three examples of synthesis atoms $s_{di}$, (i=1, 2, $N_{Dt}$) are shown in the top part of the drawing. The analysis dictionary A consists of $N_{Df}$ analysis atoms $a_{di}$, each consisting of a frequency domain spectrum of length $N_a$ ($N_a$ frequency bands, e.g. corresponding to the spectra of a number of consecutive time frames, e.g. A/L).

In a further embodiment (not illustrated), the atoms of the coupled dictionaries are again partly in the time-frequency domain (synthesis (reconstruction) dictionary R) and partly in the time domain (analysis dictionary A).

Figure 4:
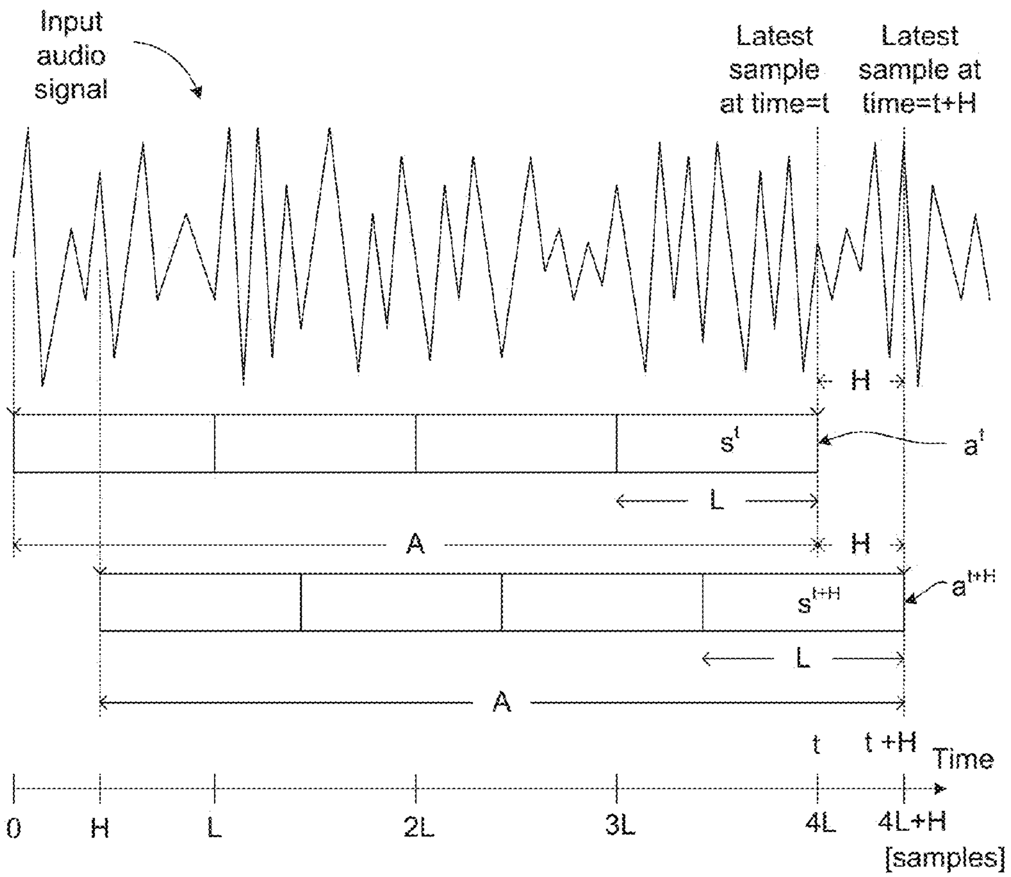
FIG. 4 shows the analysis part of the source separation procedure according to an embodiment of the present disclosure, FIGS. 5A-5D schematically illustrate four embodiments (FIG. 5A, FIG. 5B, FIG. 5C and FIG. 5D) of a hearing device (or a hearing system) according to the present disclosure.

FIG. 4 schematically illustrates the analysis part of the source separation procedure according to an embodiment of the present disclosure.

FIG. 4 illustrates time varying digitized incoming audio (Input audio signal) and the corresponding contents of analysis and synthesis frames $a^t$ and $s^t$, respectively, at times t and t+H audio samples.

The method separates the audio contained in the synthesis frame $s^t$ each time step in different sound sources (see FIG. 1B), based on the data stored in analysis frame $a^t$. At each update, the latest H audio samples are loaded into the cyclic analysis buffer ($a^{t+H}$), and the oldest H audio samples discarded. In an embodiment, the buffer contents is then transformed into the frequency domain for separation (as illustrated in FIG. 2 for the generation of dictionaries).

Separation is performed by modelling the contents of the buffer at each update (e.g. every H audio samples) as an additive sum of components (the absolute magnitude of frequencies present in the analysis frame), which are stored in pre-computed dictionaries, such as in the well established DNN, FHMM, NMF and ASNA approaches (cf. FIG. 2, 3).

FIGS. 5A-5D schematically illustrates four embodiments of a hearing device (or a hearing system) according to the present disclosure.

Figure 5A:
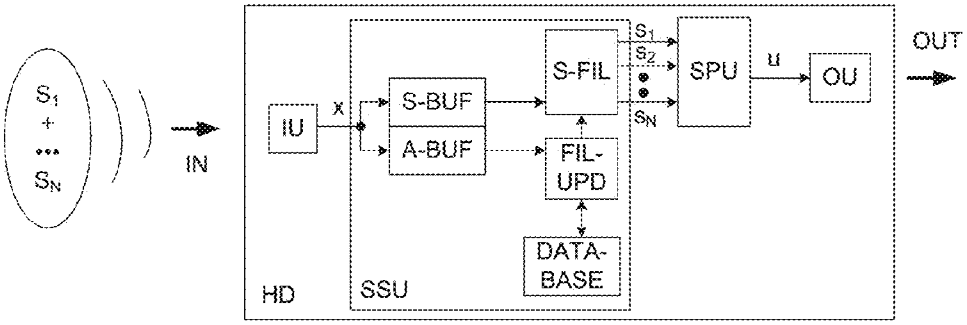

FIG. 5A shows an embodiment of a hearing device (HD) comprising an input unit (IU) for receiving an input sound signal comprising a multitude N of sound sources $S_1, S_2, \ldots, S_N$ and providing a digitized electric input signal x representing a mixed sound signal. The hearing device (HD) comprises a sound source separation unit (SSU) for separating input signal x in a multitude of separated signals ($s_1, s_2, \ldots, s_N$) as described in connection with FIG. 1-4. The hearing device (HD) also comprises a signal processing unit (SPU) for processing one or more of the separated signals ($s_1, s_2, \ldots, s_N$), e.g. for generating further improved versions thereof, e.g. by applying noise reduction or other processing algorithms to the separated signals, or mixing two or more of them in an appropriate ratio. In an embodiment, the signal processing unit (SPU) is configured to present the user with one or more of the separated signals ($s_1, s_2, \ldots, s_N$) consecutively, so that information from only a single source $s_i$ (e.g. a talker) is presented at a time. The processed output signal u is fed to output unit OU for generating output stimuli perceivable by a user as sound (symbolized by bold arrow and signal OUT). In an alternative embodiment, one or more, such as a majority or all, of the separated signals ($s_1, s_2, \ldots, s_N$) are presented to a user (or to separate users in parallel, e.g. one user for each source) via separate output transducers.

Figure 5B:
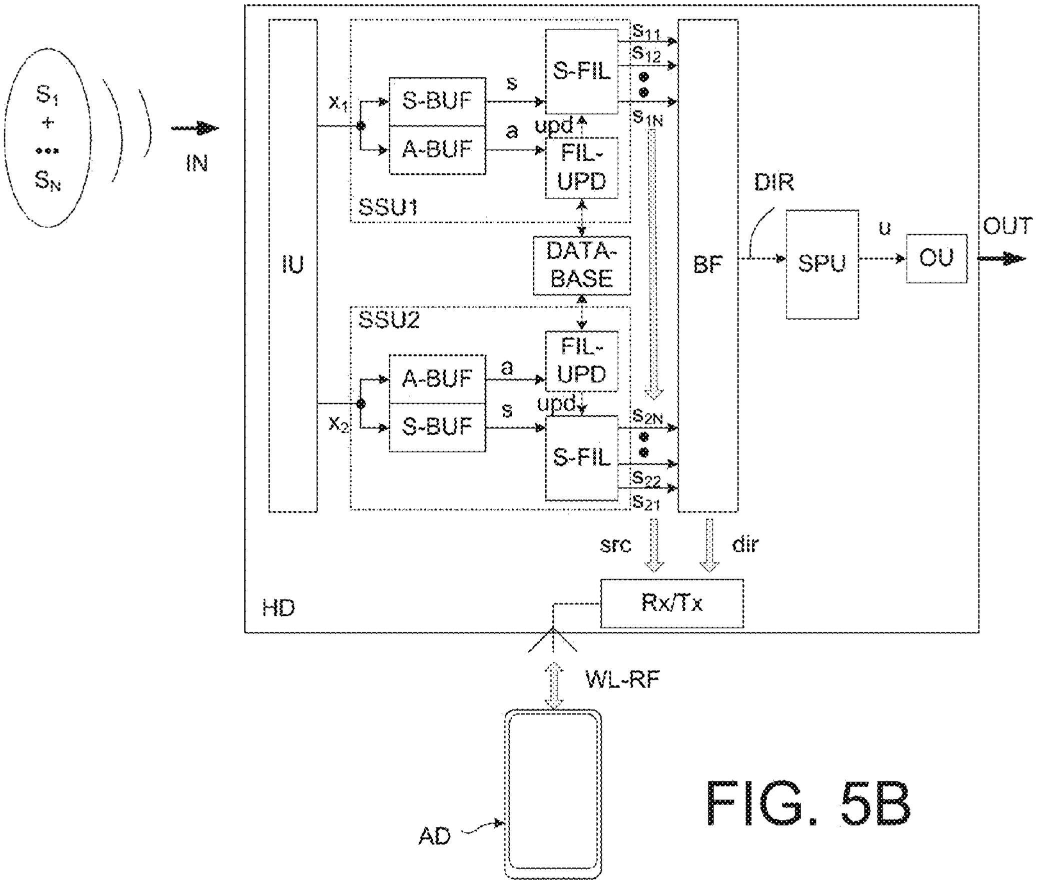

FIG. 5B shows an embodiment of a hearing device (HD) as in FIG. 5A but where the input unit (IU) provides to electric input signals $x_1$ and $x_2$ (e.g. from two input transducers), each comprising a mixture of a multitude of audio sources $S_1, S_2, \ldots, S_N$. The embodiment of FIG. 5B comprises first and second sound source separation units (SSU1, SSU2) sharing a common DATABASE, the first and second sound separation units being configured to separate input signals $x_1$ and $x_2$ in separated signals ($s_{11}, s_{12}, \ldots, s_{1N}$) and ($s_{21}, s_{22}, \ldots, s_{2N}$), respectively. The separated signals are fed to a beamformer unit providing a directional signal DIR from at least some of the separated signals. The directional signal DIR is connected to the signal processing unit (SPU) for further processing, e.g. for applying a level and/or frequency dependent gain according to the needs of a user, or as described in connection with FIG. 5A. The embodiment of FIG. 5B comprises further comprises antenna and transceiver circuitry Rx/Tx for communicating with an auxiliary device AD via wireless link WL-RF (see also FIG. 7). The hearing device HD is configured to transfer one or more of the separated signals ($s_{11}, s_{12}, \ldots, s_{1N}$) and ($s_{21}, s_{22}, \ldots, s_{2N}$) and one or more directional signal(s) (symbolized by signals src and dir, respectively, and accompanying grey arrows) to the auxiliary device AD via the wireless link WL-RF. The auxiliary device is configured to receive the signals e.g. for further processing and/or display. In an embodiment, the auxiliary device is or form part of a cellular telephone, e.g. a SmartPhone (cf. e.g. FIG. 7).

Figure 5C:
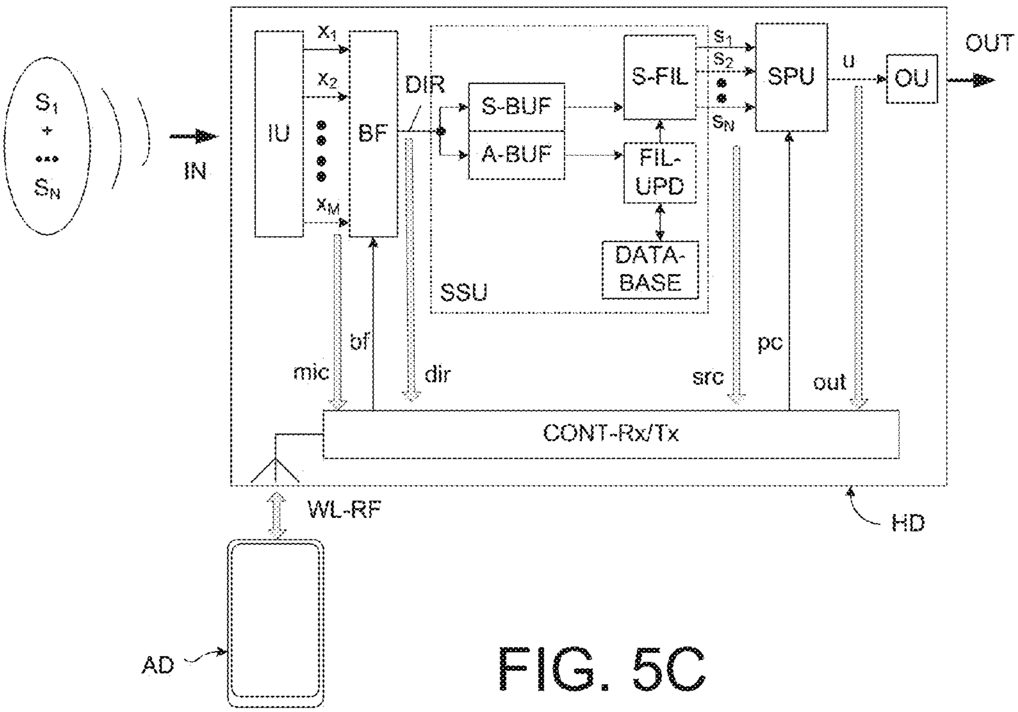

FIG. 5C shows another embodiment of a hearing device (HD), wherein the input unit IU provides a multitude M of electric input signals $x_1, x_2, \ldots, x_M$ (e.g. from M input transducers). The input signals are coupled to a beamformer unit BF that provides a directional signal DIR, which is fed to sound source separation unit (SSU) for separating directional signal DIR in a multitude of separated signals ($s_1, s_2, \ldots, s_N$) as described in connection with FIG. 1-4. The separated signals are fed to signal processing unit (SPU) for further processing and output, e.g. as described in connection with FIG. 5A or 5C. The hearing device (HD) of FIG. 5C further comprises a combined control and transceiver unit CONT-Rx/Tx for controlling and establishing a wireless link WL-RF to auxiliary device AD. As indicated by shaded arrows and signals mic, dir, src, and out, one or more of the electric input signals ($x_1, x_2, \ldots, x_M$), the directional signal(s) DIR, the separated signals ($s_1, s_2, \ldots, s_N$) and the output signal u may be transmitted to the auxiliary device via the wireless link. Likewise control signals bf and pc for controlling or influencing the beamformer unit BF and the signal processing unit SPU may be generated in the control unit CONT-Rx/Tx or received from the auxiliary device, e.g. via a user interface provided by the auxiliary device AD (cf. FIG. 7).

Figure 5D:
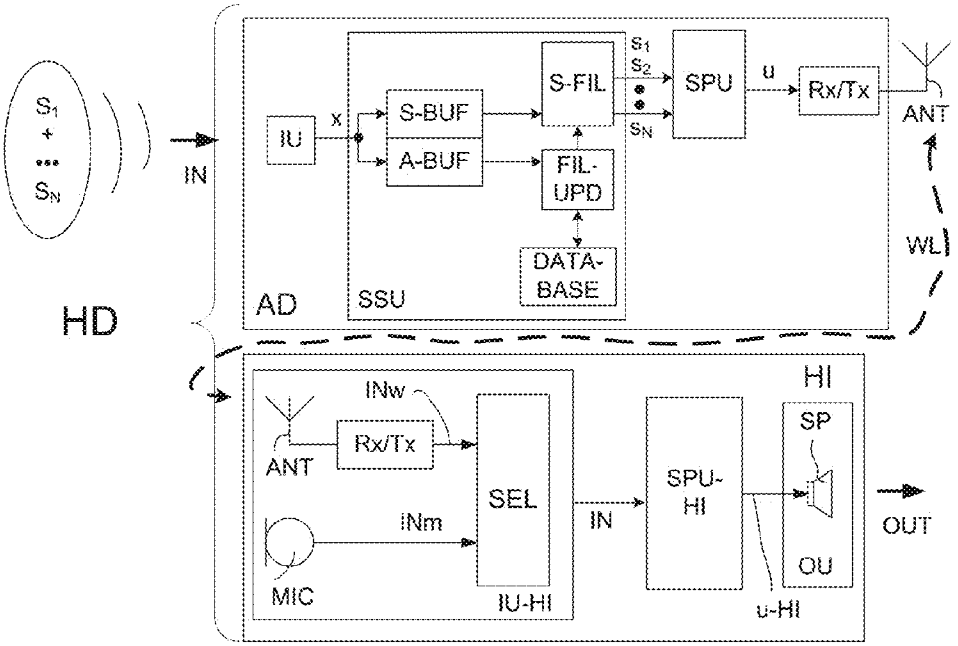

FIG. 5D shows another embodiment of hearing device comprising a hearing instrument (HI) and an auxiliary device (AD). The auxiliary device (AD) comprises the sound separation functionality. The auxiliary device (AD) comprises input unit (IU) for receiving an input sound signal comprising a multitude N of sound sources ($S_1, S_2, \ldots, S_N$) and providing a digitized electric input signal x representing a mixed sound signal. The Auxiliary Device (AD) also comprises sound source separation unit (SSU) for separating input signal x in a multitude of separated signals ($s_1, s_2, \ldots, s_N$) as described in connection with FIG. 1-4. The Auxiliary Device (AD) further comprises a signal processing unit (SPU) for processing one or more of the separated signals ($s_1, s_2, \ldots, s_N$), e.g. for generating further improved versions thereof, e.g. by applying noise reduction or other processing algorithms to the separated signals, or mixing two or more of them in an appropriate ratio. The processed output u is transferred to the hearing instrument (HI) over wireless connection WL implemented by corresponding antenna and transceiver circuitry (ANT, Rx/Tx) in the auxiliary device and the hearing instrument. The hearing instrument (HI) is configured to receive the processed output signal u and to present the signal to a user via output unit OU (here loudspeaker SP) as a sound signal OUT. The hearing instrument (HI) is further shown to comprise an optional microphone unit MIC (for picking up an acoustic sound from the environment) and a selection unit SEL for selecting (or mixing) the wirelessly received signal INw from the auxiliary device or the microphone signal INm (in the embodiment of FIG. 5D, the transceiver, microphone, and selection units together form input unit IU-HI). The resulting signal IN from the selection unit is presented to an optional signal processing unit (SPU-HI), and the optionally processed signal u-HI is presented to the user via speaker SP as sound signal OUT. This partition of the functional tasks of sound separation and presentation to a user has the advantage that the tasks requiring a lot of processing (sound separation) is separated from the ear worn hearing instrument (of small size, low energy capacity). The processing demanding tasks are performed in a special device (AD, e.g. a remote control of other hand held device (e.g. a SmartPhone)) having more electric power and processing capacity than the ear worn hearing instrument (HI).

In a further alternative embodiment (not shown) comprising the same functional parts as the embodiment of FIG. 5D, and having a similar but slightly different partition of tasks, the auxiliary device AD again comprises input unit (IU) for receiving an input sound signal comprising a multitude N of sound sources $S_1, S_2, \ldots, S_N$, and a (part of the) sound source separation unit (SSU-AD) including the analysis part of the database (A-BUF, and FIL-UPD in the embodiments of FIG. 5A-5D) for separating the input signal x into a multitude weights ($w_1, w_2, \ldots w_N$) defining the separated signals as described in connection with FIG. 1-4. The hearing instrument, on the other hand comprises another (part of the) source separation unit (SSU-HI) with the synthesis part of the database (unit S-FIL in the embodiments of FIG. 5A-5D) for reconstructing the multitude of separated signals, and the output unit OU. The weights ($w_1, w_2, \ldots w_N$) are transmitted to the hearing instrument HI via wireless link WL and applied to filter unit S-FIL to provide separated signal in the ($s_1, s_2, \ldots, s_N$). The corresponding contents of the synthesis buffer may be transmitted from the auxiliary device to the hearing instrument together with the filter weights. Alternatively, the synthesis buffer may be crated in the hearing instrument from a signal picked up by a microphone (MIC) of the input unit (IU-HI in FIG. 5D). The separated signals may e.g. be further processed in a signal processing unit (SPU-HI in FIG. 5D) of the hearing instrument as described in connection with other embodiments before presentation to the user via output unit OU of the hearing instrument.

Figure 6:
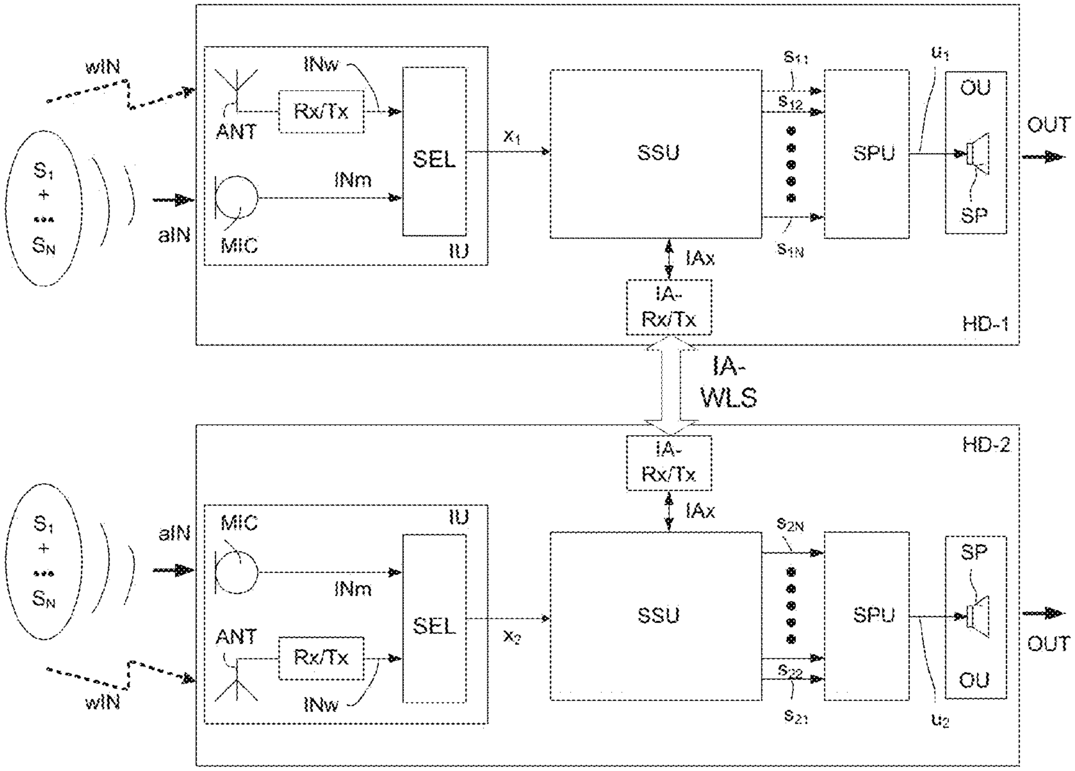
FIG. 6 shows an embodiment of a binaural hearing system according to the present disclosure, where two hearing devices exchange input, intermediate, and outputs signals as part of a binaural separation algorithm.

FIG. 6 shows an embodiment of a binaural hearing system comprising first and second hearing devices (HD-1, HD-2) to the present disclosure, where the two hearing devices may exchange input signals, intermediate signals, and output signals as part of a binaural separation algorithm. The first and second hearing devices (HD-1, HD-2) may e.g. comprise elements and embodiments as discussed in connection with FIG. 1-5. The input unit IU of the first and second hearing devices (HD-1, HD-2) comprises a microphone MIC for picking up acoustic input aIN comprising a mixture of sound sources $S_1, S_2, \ldots, S_N$, and providing electric input signal INm, which is fed to a first input of selection or mixing unit SEL. The input unit IU further comprises antenna and wireless transceiver (ANT, Rx/Tx) (at least) for receiving a direct electric signal wIN comprising control and/or audio signals form another device (e.g. a remote control device and/or a cellular telephone), and providing electric input signal INw, which is fed to a second input of selection or mixing unit SEL. Input unit IU provides (as an output from selection or mixing unit SEL) a resulting electric input signal x ($x_1$ and $x_2$ in HD-1 and HD-2, respectively). Each of the first and second hearing devices (HD-1, HD-2) comprises respective sound separation units (SSU), signal processing units (SPU) and output units (OU), e.g. as discussed in connection with FIG. 5. Each of the first and second hearing devices (HD-1, HD-2) further comprises antenna and transceiver circuitry IA-Rx/Tx for establishing an interaural wireless link IA-WLS between the two devices. As indicated in connection with embodiments of FIGS. 5B and 5C, the first and second hearing devices are configured to exchange input signals, intermediate signals (e.g. sound separated signals, control signals), and output signals (symbolized by signals IAx and double arrowed line between the sound separation units (SSU) and the transceiver units (IA-Rx/Tx) in each of the first and second hearing devices) as part of a binaural separation algorithm to thereby improve binaural processing of audio signals.

Figure 7:
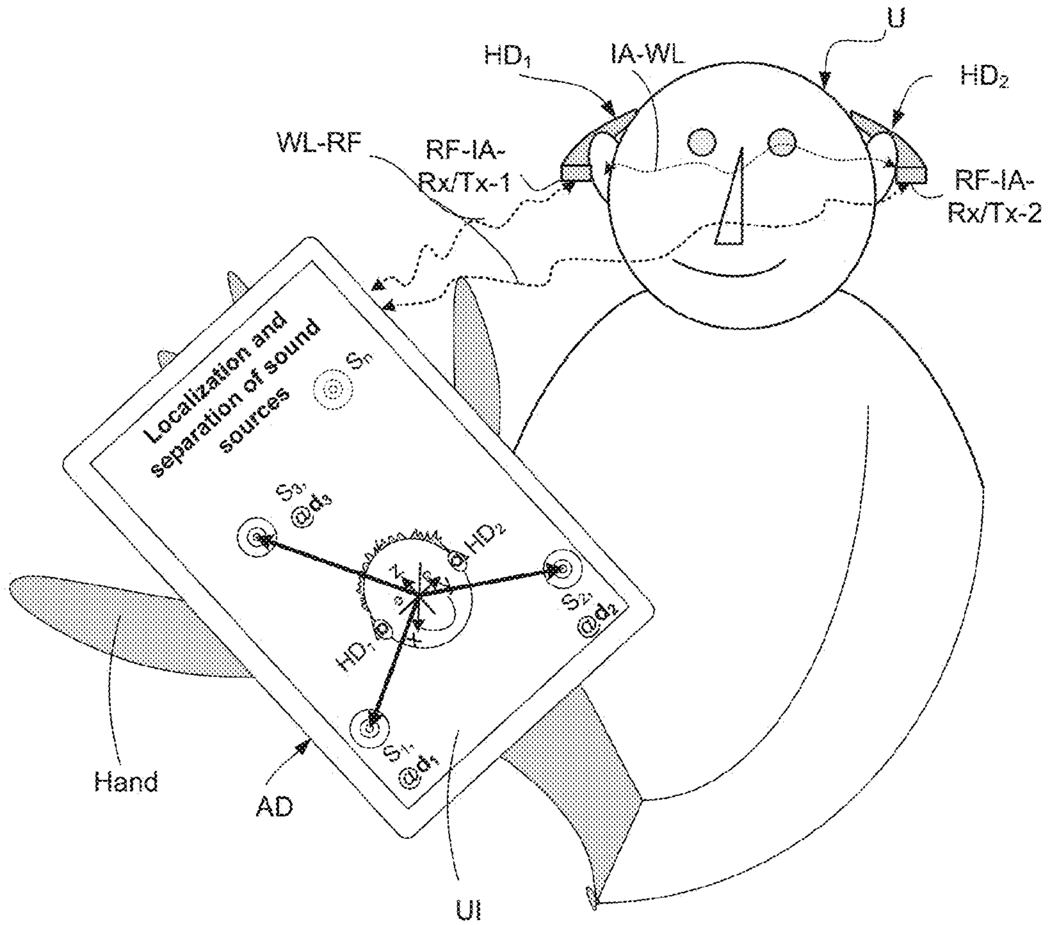
FIG. 7 shows an embodiment of hearing system according to the present disclosure comprising two hearing devices and an auxiliary device, wherein the auxiliary device comprises a user interface.

FIG. 7 shows an embodiment of hearing system according to the present disclosure comprising two hearing devices ($HD_1$, $HD_2$) and an auxiliary device (AD), wherein the auxiliary device comprises a user interface (UI) for displaying the currently present sources and—if available—the position relative to a user (U) of the currently present sound sources ($S_1, S_2, S_3$). In an embodiment, the sound source separation occurs in the auxiliary device. In an embodiment, the sound source localization takes place in the hearing devices. In an embodiment, the two hearing devices and the auxiliary device each comprises one or more microphones. In an embodiment, the two hearing devices and the auxiliary device each comprises antenna and transceiver circuitry allowing the devices to communicate with each other, e.g. to exchange audio and/or control signals. In an embodiment, the auxiliary device is a remote control device for controlling the functionality of the hearing devices. In an embodiment, the auxiliary device AD is a cellular telephone, e.g. a SmartPhone.

The user interface (UI) is e.g. adapted for viewing and (possibly) influencing the directionality (e.g. the separated source to listen to) of current sound sources ($S_s$) in the environment of the binaural hearing system.

The right and left hearing devices ($HD_1$, $HD_2$) are e.g. implemented as described in connection with FIG. 1-6. The first and second hearing devices ($HD_1$, $HD_2$) and the auxiliary device (AD) each comprise relevant antenna and transceiver circuitry for establishing wireless communication links between the hearing devices (link IA-WL) as well as between at least one of or each of the assistance devices and the auxiliary device (link WL-RF). The antenna and transceiver circuitry in each of the first and second hearing devices necessary for establishing the two links is denoted RF-IA-RX/Tx-1, and RF-IA-RX/Tx-2, respectively, in FIG. 7. Each of the first and second hearing devices ($HD_1$, $HD_2$) comprises respective source separation units according to the present disclosure. In an embodiment, the interaural link IA-WL is based on near-field communication (e.g. on inductive coupling), but may alternatively be based on radiated fields (e.g. according to the Bluetooth standard, and/or be based on audio transmission utilizing the Bluetooth Low Energy standard). In an embodiment, the link WL-RF between the auxiliary device and the hearing devices is based on radiated fields (e.g. according to the Bluetooth standard, and/or based on audio transmission utilizing the Bluetooth Low Energy standard), but may alternatively be based on near-field communication (e.g. on inductive coupling). The bandwidth of the links (IA-WL, WL-RF) is preferably adapted to allow sound source signals (or at least parts thereof, e.g. selected frequency bands and/or time segments) and/or localization parameters identifying a current location of a sound source to be transferred between the devices. In an embodiment, processing of the system (e.g. sound source separation) and/or the function of a remote control is fully or partially implemented in the auxiliary device AD. In an embodiment, the user interface UI is implemented by the auxiliary device AD possibly running an APP allowing to control the functionality of the hearing system, e.g. utilizing a display of the auxiliary device AD (e.g. a SmartPhone) to implement a graphical interface (e.g. combined with text entry options).

In an embodiment, the binaural hearing system is configured to allow a user to select a current sound source which has been determined by the source separation unit for being focused on (e.g. played to the user via the output unit OU of the hearing device or the auxiliary device). As illustrated in the exemplary screen of the auxiliary device in FIG. 7, a Localization and separation of the sound sources APP is active and the currently identified sound sources ($S_1, S_2, S_3$) as defined by sound source separation and beamforming units of the first and second hearing devices are displayed by the user interface (UI) of the auxiliary device (which is convenient for viewing and interaction via a touch sensitive display, when the auxiliary device is held in a hand (Hand) of the user (U)). In the illustrated example in FIG. 7, the location of the 3 identified sound sources $S_1$, $S_2$ and $S_3$ (as represented by respective vectors $d_1$, $d_2$, and $d_3$ in the indicated orthogonal coordinate system (x, y, z) having its center between the respective first and second hearing devices ($HD_1$, $HD_2$) are displayed relative to the user (U).

It is intended that the structural features of the devices described above, either in the detailed description and/or in the claims, may be combined with steps of the method, when appropriately substituted by a corresponding process.

As used, the singular forms “a,” “an,” and “the” are intended to include the plural forms as well (i.e. to have the meaning “at least one”), unless expressly stated otherwise. It will be further understood that the terms “includes,” “comprises,” “including,” and/or “comprising,” when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being “connected” or “coupled” to another element, it can be directly connected or coupled to the other element but an intervening elements may also be present, unless expressly stated otherwise. Furthermore, “connected” or “coupled” as used herein may include wirelessly connected or coupled. As used herein, the term “and/or” includes any and all combinations of one or more of the associated listed items. The steps of any disclosed method is not limited to the exact order stated herein, unless expressly stated otherwise.

It should be appreciated that reference throughout this specification to “one embodiment” or “an embodiment” or “an aspect” or features included as “may” means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein, but is to be accorded the full scope consistent with the language of the claims, wherein reference to an element in the singular is not intended to mean “one and only one” unless specifically so stated, but rather “one or more.” Unless specifically stated otherwise, the term “some” refers to one or more.

Accordingly, the scope should be judged in terms of the claims that follow.

SYMBOLS $a^t$ Time-domain analysis frame $s^t$ Time-domain synthesis frame

A Length in samples of $a^t$

L Length in samples of $s^t$ y Real-valued feature vector formed from $a^t$ s Complex-valued synthesis vector formed from $s^t$ A Analysis dictionary R Reconstruction dictionary $R_{:,k}$ The $k^{th}$ column of dictionary R.

w Weights vector for a single output frame $s_n$ The reconstructed frame for the $n^{th}$ source in a mixture n Subscript referring to the $n^{th}$ source in dictionaries, weights, or reconstructed frames.

REFERENCES

[1] C. Joder, F. Weninger, F. Eyben, D. Virette and B. Schuller, “Real-Time Speech Separation by Semi-supervised Nonnegative Matrix Factorization,” in Latent Variable Analysis and Signal Separation, Lecture Notes in Computer Science Volume 7191, Springer, 2012, pp. 322-329.

[2] Z. Duan, G. Mysore and P. Smaragdis, “Online PCLA for Real-Time Semi-supervised Source Separation,” in Latent Variable Analysis and Signal Separation, Lecture Notes in Computer Science Volume 7191, Springer, 2012, pp. 34-41.

[3] J. H. Gomez, “Low Latency Audio Source Separation for Speech Enhancement in Cochlear Implants (Master's Thesis),” Universitat Pompeu Fabra, Barcelona, 2012.

[4] R. Marxer, J. Janer and J. Bonada, “Low-Latency Instrument Separation in Polyphonic Music Using Timbre Models,” in Latent Variable Analysis and Signal Separation, Tel Aviv, 2012.

[5] T. Barker, G. Campos, P. Dias, J. Viera, C. Mendonca and J. Santos, “Real-time Auralisation System for Virtual Microphone Positioning,” in Int. Conference on Digital Audio Effects (DAFx-12), York, 2012.

[6] T. Virtanen, J. F. Gemmeke, and B. Raj, “Active-Set Newton Algorithm for Overcomplete Non-Negative Representations of Audio,” IEEE Transactions on Audio, Speech and Language Processing, 2013.

[7] T. Virtanen, B. Raj, J. F. Gemmeke, and H. Van Hamme, “Active-set newton algorithm for non-negative sparse coding of audio,” in In Proc. International Conference on Acoustics, Speech, and Signal Processing, 2014.

The invention claimed is:

1. A hearing device comprising:

an input unit for delivering a time varying electric input signal representing an observed audio signal comprising at least two sound sources, a cyclic analysis buffer unit of length A adapted for storing the last A audio samples, a cyclic synthesis buffer unit of length L, where L is smaller than A, adapted for storing the last L audio samples, which are intended to be separated in individual sound sources, a database storing an analysis dictionary and a reconstruction dictionary of recorded sound examples from each of the at least two sound sources, each recorded sound example in the database being termed an atom, wherein the reconstruction dictionary includes atoms, from each of the at least two sound sources, originating from audio samples from a first buffer of length L and the analysis dictionary includes atoms, from each of the at least two sound sources, originating from audio samples from a second buffer of length A, where for each atom, the audio samples from the first buffer overlap with the audio samples from the second buffer such that audio samples from first and second buffers form atom pairs between the analysis and reconstruction dictionaries, a sound source separation unit for separating said electric input signal to provide at least two separated signals representing said at least two sound sources, the sound source separation unit being configured to estimate the observed audio signal as a weighted summation of the atoms in the dictionaries stored in the database, determine an optimal weight representation (W) of the last A audio samples of the observed audio signal by minimizing a cost function between the samples of the observed audio signal and the estimated signal given the atoms in the analysis dictionary of the database, and generate said at least two separated signals of L audio samples by combining atoms in the reconstruction dictionary of the database using the optimal weight representation (W).

2. A hearing device according to claim 1 comprising a time frequency conversion unit for providing the contents of said analysis buffer units in a time-frequency representation (k,m), wherein the corresponding time segment of the electric input signal is provided in a number of frequency bands at a number of time instances, k being a frequency band index and m being a time index, and wherein (k,m) defines a specific time-frequency bin or unit comprising a signal component in the form of a complex or real value of the electric input signal corresponding to frequency index k and time instance m.

3. A hearing device according to claim 2 comprising a time-frequency to time conversion unit for providing the time domain representation of the separated sources.

4. A hearing device according to claim 1 comprising a feature extraction unit for extracting characteristic features of the contents of said analysis buffer unit and said synthesis buffer unit.

5. A hearing device according to claim 1 wherein the sound separation unit is configured to base said sound source separation on Non Negative Matrix Factorization (NMF), Hidden Markov Model (HMM), or Deep Neural Networks (DNN).

6. A hearing device according to claim 1 wherein each corresponding atom pair originating from audio samples from first and second buffers of said database comprises an identifier of the sound source from which it originates.

7. A hearing device according to claim 6 wherein the sound source separation unit is configured to use the identifier of the sound source to generate said at least two sound sources.

8. A hearing device according to claim 1 comprising a control unit for controlling the update of the analysis and synthesis buffer units with a predefined update frequency, and configured—at each update—to store in the analysis and synthesis buffers the last H audio samples received from the input unit and discarding the oldest H audio samples stored in the analysis and synthesis buffer units.

9. A hearing device according to claim 1 comprising a signal processing unit for processing one or more of said separated signals representing said at least two sound sources.

10. A hearing device according to claim 1 comprising a directional microphone system.

11. A hearing device according to claim 1 which for each of said at least two sound sources comprise a separate dictionary for the purposes of analysis and reconstruction, respectively.

12. A hearing device according to claim 1 comprising a hearing aid, a headset, an ear phone, an active ear protection systems or a combination thereof.

13. A hearing device according to claim 1, wherein the functional components of the hearing device are enclosed in a single device.

14. A hearing device according to claim 1, wherein the functional components of the hearing device are enclosed in several separate devices.

15. A hearing device according to claim 14, wherein the several separate devices are adapted to be in wired or wireless communication with each other.

16. A hearing device according to claim 1 comprising a hearing instrument and an auxiliary device configured to allow an exchange of data between them.

17. A hearing device according to claim 16 wherein the hearing instrument is an ear worn hearing instrument and processing demanding tasks are performed in the auxiliary device having more electric power and processing capacity than the ear worn hearing instrument.

18. A hearing device according to claim 16 wherein at least a part of the database is located in the auxiliary device.

19. A hearing device according to claim 16 wherein the sound source separation unit is located in the auxiliary device.

20. A hearing device according to claim 16 wherein the auxiliary device is or comprises a remote control or other hand held device.

21. A hearing device according to claim 20 wherein the remote control is implemented in a smartphone, the smartphone running an application allowing the user to control the functionality of the hearing device via the smartphone, the hearing device comprising an appropriate wireless interface to the smartphone.

22. A hearing device according to claim 16 wherein the auxiliary device comprises the input unit for receiving an input sound signal comprising a multitude of sound sources and providing a digitized electric input signal representing a mixed sound signal.

23. A hearing device according to claim 16 wherein the auxiliary device comprises a signal processing unit for processing one or more of the separated signals.

24. A hearing device according to claim 23 wherein the processed output is transferred to the hearing instrument over a wireless connection implemented by corresponding antenna and transceiver circuitry in the auxiliary device and the hearing instrument.

25. A hearing device according to claim 24 wherein the hearing instrument is configured to receive the processed output signal and to present the signal to a user via an output unit as a sound signal.

26. A hearing device according to claim 16 wherein the auxiliary device comprises a user interface.

27. A hearing device according to claim 26 wherein the user interface is configured to display currently present sound sources.

28. A hearing device according to claim 27 wherein the user interface is configured to display a position relative to a user of the currently present sound sources.

29. A hearing device according to claim 1 configured to provide sound source separation with a latency less than or equal to 20 ms between an audio sample entering and leaving the source separation system.

30. A hearing device according to claim 29, wherein the sizes of the synthesis and analysis frame lengths are optimized to minimize latency.

31. A method of separating sound sources in a multi-sound-source environment, the method comprising providing a time varying electric input signal representing an observed audio signal comprising at least two sound sources, providing a cyclic analysis buffer unit of length A adapted for storing the last A audio samples, providing a cyclic synthesis buffer unit of length L, where L is smaller than A, adapted for storing the last L audio samples, which are intended to be separated in individual sound sources, providing a database storing an analysis dictionary and a reconstruction dictionary of recorded sound examples from each of the at least two sound sources, each recorded sound example in the database being termed an atom, wherein the reconstruction dictionary includes atoms, from each of the at least two sound sources, originating from audio samples from a first buffer of length L and the analysis dictionary includes atoms, from each of the at least two sound sources, originating from audio samples from a second buffer of length A, where for each atom, the audio samples from the first buffer overlap with the audio samples from the second buffer such that audio samples from the first and second buffers form atom pairs between the analysis and reconstruction dictionaries, and separating said electric input signal to provide separated signals representing said at least two sound sources by estimating the observed audio signal as a weighted summation of the atoms of the database, determining an optimal weight representation (W) of the last A audio samples of the observed audio signal by minimizing a cost function between the samples of the observed audio signal and the estimated signal given the atoms in the analysis dictionary of the database, and generating said separated signals by combining atoms in the reconstruction dictionary of the database using the optimal weight representation (W).

32. A data processing system comprising a processor and program code means for causing the processor to perform the steps of the method comprising:

providing a time varying electric input signal representing an observed audio signal comprising at least two sound sources, providing a cyclic analysis buffer unit of length A adapted for storing the last A audio samples, providing a cyclic synthesis buffer unit of length L, where L is smaller than A, adapted for storing the last L audio samples, which are intended to be separated in individual sound sources, providing a database storing an analysis dictionary and a reconstruction dictionary of recorded sound examples from each of the at least two sound sources, each recorded sound example in the database being termed an atom, wherein the reconstruction dictionary includes atoms, from each of the at least two sound sources, originating from audio samples from a first buffer of length L and the analysis dictionary includes atoms, from each of the at least two sound sources, originating from audio samples from a second buffer of length A, where for each atom, the audio samples from the first buffer overlap with the audio samples from the second buffer such that audio samples from the first and second buffers form atom pairs between the analysis and reconstruction dictionaries, and separating said electric input signal to provide separated signals representing said at least two sound sources by estimating the observed audio signal as a weighted summation of the atoms in the database, determining an optimal weight representation (W) of the last A audio samples of the observed audio signal by minimizing a cost function between the samples of the observed audio signal and the estimated signal given the atoms in the analysis dictionary of the database, and generating said separated signals by combining atoms in the reconstruction dictionary of the database using the optimal weight representation (W).

* * * * *